United States Patent
Lerman et al.

(10) Patent No.: US 9,251,438 B2
(45) Date of Patent: Feb. 2, 2016

(54) CONVEX MINIMIZATION AND DATA RECOVERY WITH LINEAR CONVERGENCE

(71) Applicant: Regents of the University of Minnesota, St. Paul, MN (US)

(72) Inventors: Gilad Lerman, St. Paul, MN (US); Teng Zhang, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 14/062,536

(22) Filed: Oct. 24, 2013

(65) Prior Publication Data
US 2014/0112575 A1  Apr. 24, 2014

Related U.S. Application Data

(60) Provisional application No. 61/717,994, filed on Oct. 24, 2012.

(51) Int. Cl.
| | |
|---|---|
| *G06K 9/36* | (2006.01) |
| *G06K 9/66* | (2006.01) |
| *G06K 9/34* | (2006.01) |
| *G06T 17/00* | (2006.01) |
| *G06T 3/40* | (2006.01) |
| *G06F 17/11* | (2006.01) |
| *G06K 9/62* | (2006.01) |

(52) U.S. Cl.
CPC .... *G06K 9/66* (2013.01); *G06F 17/11* (2013.01); *G06K 9/34* (2013.01); *G06K 9/6247* (2013.01); *G06T 3/40* (2013.01); *G06T 17/00* (2013.01)

(58) Field of Classification Search
None
See application file for complete search history.

(56) References Cited

PUBLICATIONS

Zhang et al., "Median K-Flats for Hybrid Linear Modeling with Many Outliers," Computer Vision Workshops (ICCV Workshops), IEEE 12th International Conference on Computer Vision, Sep. 2009, pp. 234-241.

Ammann, "Robust Singular Value Decompositions: A New Approach to Projection Pursuit," Journal of the American Statistical Association, vol. 88(422), Jun. 1993, pp. 505-514.

Brubaker, "Robust PCA and Clustering in Noisy Mixtures," in proceedings of the twentieth annual ACM-SIAM Symposium on Discrete Algorithms, SODA '09, Society for Industrial and Applied Mathematics, Jan. 2009, pp. 1078-1087.

Cand'es et al., "Robust Principal Component Analysis," J. ACM, vol. 58(3)(11), May 2011, 37 pp.

Chandrasekaran et al., "Rank-sparsity Incoherence for Matrix Decomposition," SIAM J. Optim, vol. 21(2), Jun. 2011, pp. 572-596.

(Continued)

*Primary Examiner* — Sumati Lefkowitz
*Assistant Examiner* — David Perlman
(74) *Attorney, Agent, or Firm* — Shumaker & Sieffert, P.A.

(57) ABSTRACT

A convex minimization is formulated to robustly recover a subspace from a contaminated data set, partially sampled around it, and propose a fast iterative algorithm to achieve the corresponding minimum. This disclosure establishes exact recovery by this minimizer, quantifies the effect of noise and regularization, and explains how to take advantage of a known intrinsic dimension and establish linear convergence of the iterative algorithm. The minimizer is an M-estimator. The disclosure demonstrates its significance by adapting it to formulate a convex minimization equivalent to the non-convex total least squares (which is solved by PCA). The technique is compared with many other algorithms for robust PCA on synthetic and real data sets and state-of-the-art speed and accuracy is demonstrated.

26 Claims, 10 Drawing Sheets

(56) References Cited

PUBLICATIONS

Croux et al., "Principal Component Analysis Based on Robust Estimators of the Covariance or Correlation Matrix: Influence Functions and Efficiencies," Biometrika, vol. 87(3), Sep. 2000, pp. 603-618.

Croux et al., "Algorithms for Projection-Pursuit Robust Principal Component Analysis," Chemometrics and Intelligent Laboratory Systems, vol. 87(2), Jun. 2007, pp. 218-225.

Devlin et al., "Robust Estimation Matrices and Principal Components," Journal of the American Statistical Association, vol. 76(374), Jun. 1981, pp. 354-362.

Ding et al., "R1-PCA: Rotational Invariant L1-norm Principal Component Analysis for Robust Subspace Factorization," in ICML '06: Proceedings of the 23rd International Conference on Machine Learning, Jun. 2006, pp. 281-288.

Fornasier et al., "Low-rank Matrix Recovery Via Iteratively Reweighted Least Squares Minimization," SIAM J. Optim., vol. 21(4), Dec. 2011, pp. 1614-1640.

Hardt et al., "Algorithms and Hardness for Robust Subspace Recovery," in Proceedings of the Twenty-sixth Annual Conference on Learning Theory (COLT), Dec. 2013, 21 pp.

Hsu et al., "Robust Matrix Decomposition with Sparse Corruptions," Information Theory, IEEE Transactions, vol. 57 (11), Nov. 2011, pp. 7221-7234.

Huber et al., "Robust Statistics," Probability and Mathematical Statistics, Table of Contents, 2009, 9 pp.

Ke et al., "Robust Subspace Computation using L1 Norm," Technical Report, Carnegie Mellon University, 2003, 17 pp. (Note: Applicant points out in accordance with MPEP 609.04(a) that the 2003 year of publication is sufficiently earlier than the effective U.S. filed and any foreign priority date of Oct. 24, 2013 so that the particular month of publication is not in issue.)

Kent et al., "Redescending M-estimates of Multivariate Location and Scatter," The Annals of Statistics, vol. 19(4), Dec. 1991, pp. 2102-2119.

Kwak, "Principal Component Analysis Based on L1-Norm Maximization," Pattern Analysis and Machine Intelligence, IEEE Transactions, vol. 30(9), Sep. 2008, pp. 1672-1680.

Lerman et al., "Robust Computation of Linear Models, or How to Find a Needle in a Haystack," ArXiv e-Prints, Feb. 2012, 45 pp.

Li et al., "Projection-Pursuit Approach to Robust Dispersion Matrices and Principal Components: Primary Theory and Monte Carlo," Journal of the American Statistical Association, vol. 80(392), Sep. 1985, pp. 759-766.

Lin et al., "Fast Convex Optimization Algorithms for Exact Recovery of a Corrupted Low-rank Matrix," International Workshop on Comp. Adv. in Multi-Sensor Adapt. Processing, 2009, 18 pp. (Note: Applicant points out in accordance with MPEP 609.04(a) that the 2009 year of publication is sufficiently earlier than the effective U.S. filed and any foreign priority date of Oct. 24, 2013 so that the particular month of publication is not in issue.)

Liu et al., "Robust Recovery of Subspace Structures by Lowrank Representation," Pattern Analysis and Machine Intelligence, IEEE Transactions, vol. 35(1), Jan. 2013, pp. 171-184.

Maronna, "Robust M-Estimators of Multivariate Location and Scatter," The Annals of Statistics, vol. 4(1), Jan. 1976, pp. 51-67.

Maronna et al., "Robust Statistics: Theory and Methods," Probability and Statistics, Table of Contents, John Wiley & Sons Ltd., Chichester, 2006, 11 pp. (Note: Applicant points out in accordance with Mpep 609.04(a) that the 2010 year of publication is sufficiently earlier than the effective U.S. filed and any foreign priority date of Oct. 24, 2013 so that the particular month of publication is not in issue.)

McCoy et al., "Two Proposals for Robust PCA Using Semidefinite Programming," Elec. J. Stat., vol. 5, Sep. 2011, pp. 1123-1160.

Nyquist, "Least Orthogonal Absolute Deviations," Computational Statistics & Data Analysis, vol. 6(4), Jun. 1988, pp. 361-367.

Spath et al., "On Orthogonal L1 Linear Approximation," Numer. Math., vol. 51, Oct. 1987, pp. 531-543.

De La Torre et al., "Robust Principal Component Analysis for Computer Vision," Computer Vision, ICCV Proceedings of the Eighth IEEE International Conference, vol. 1, Jul. 7-14, 2001, pp. 362-369.

De La Torre et al., "A Framework for Robust Subspace Learning," International Journal of Computer Vision, vol. 54 (1/2/3), Aug. 2003, pp. 117-142.

Tyler, "A Distribution-free M-estimator of Multivariate Scatter," Ann. Statist., vol. 15(1), Mar. 1987, pp. 234-251.

Xu et al., "Principal Component Analysis with Contaminated Data: The High Dimensional Case," COLT, 2010, pp. 490-502. (Note: Applicant points out in accordance with MPEP 609.04(a) that the 2010 year of publication is sufficiently earlier than the effective U.S. filing date and any foreign priority date of Oct. 24, 2013 so that the particular month of publication is not in issue.)

Xu et al., "Robust PCA Via Outlier Pursuit," Information Theory, IEEE Transactions, vol. PP(99), Dec. 2010, 30 pp.

Xu et al., "Robust Principal Component Analysis by Self-Organizing Rules Based on Statistical Physics Approach," Neural Networks, IEEE Transactions, vol. 6(1), Jan. 1995, pp. 131-143.

Zhang, "Robust Subspace Recovery by Geodesically Convex Optimization," ArXiv e-Prints, Jun. 2012, 11 pp.

CONVEX MINIMIZATION AND DATA RECOVERY WITH LINEAR CONVERGENCE

This application claims the benefit of U.S. Provisional Application 61/717,994, filed Oct. 24, 2012, the entire content of which is incorporated herein by reference.

GOVERNMENT INTEREST

This invention was made with government support under DMS-0915064 and DMS-0956072 awarded by the National Science Foundation. The government has certain rights in the invention.

TECHNICAL FIELD

The invention relates to sensing systems and, more specifically, data analysis for sensing system and machine learning.

BACKGROUND

The most useful paradigm in data analysis and machine learning is arguably the modeling of data by a low-dimensional subspace. The well-known total least squares solves this modeling problem by finding the subspace minimizing the sum of squared errors of data points. This is practically done via principal components analysis (PCA) of the data matrix. Nevertheless, this procedure is highly sensitive to outliers.

SUMMARY

In general, the invention techniques are described in which an iterative algorithm is applied to formulate a convex minimization to robustly recover a subspace from a contaminated data set, partially sampled around it. This disclosure establishes exact recovery by this minimizer, quantifies the effect of noise and regularization, and explains how to take advantage of a known intrinsic dimension and establish linear convergence of the iterative algorithm. The minimizer is an M-estimator. The disclosure demonstrates its significance by adapting it to formulate a convex minimization equivalent to the non-convex total least squares (which is solved by PCA). The technique is compared with many other algorithms for robust PCA on synthetic and real data sets and state-of-the-art speed and accuracy is demonstrated.

In one embodiment, a method comprises receiving, with a device, multidimensional data comprising a set of data points, wherein the set of data points conforms to a plurality of dimensions (D) and includes outlier data points, and iteratively processing the set of data points with the device to compute a reduced data set representative of the set of data points, wherein the reduced data set conforms to a subspace having a reduced number of dimensions (d) less than the plurality of dimensions (D) of the set of data points. According to the method, iteratively processing the set of data points to compute the reduced data set comprises determining, for each iteration, a scaled version of the set of data points by re-computing a corresponding coefficient for each of the data points as a function of a proximity of the data point to a current estimate of the subspace, and computing, for each iteration, an updated estimate of the subspace based on a minimization of a sum of least squares of the scaled version of the set of data points. The iteratively processing of the multidimensional data to compute the reduced data set has a processing complexity with linear convergence with respect to the number of iterations.

In another embodiment, a device comprises a memory to store multidimensional data having a set of outliers. A processor is configured to execute program code to process the multidimensional data with the device to compute a reduced data set that is representative of the multidimensional data without the outliers. The program code iteratively processes the set of data points with the device to compute a reduced data set representative of the set of data points, wherein the reduced data set conforms to a subspace having a reduced number of dimensions (d) less than the plurality of dimensions (D) of the set of data points. During this transformation of the data, the program code determines, for each iteration, a scaled version of the set of data points by re-computing a corresponding coefficient for each of the data points as a function of a proximity of the data point to a current estimate of the subspace and computes, for each iteration, an updated estimate of the subspace based on a minimization of a sum of least squares of the scaled version of the set of data points.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
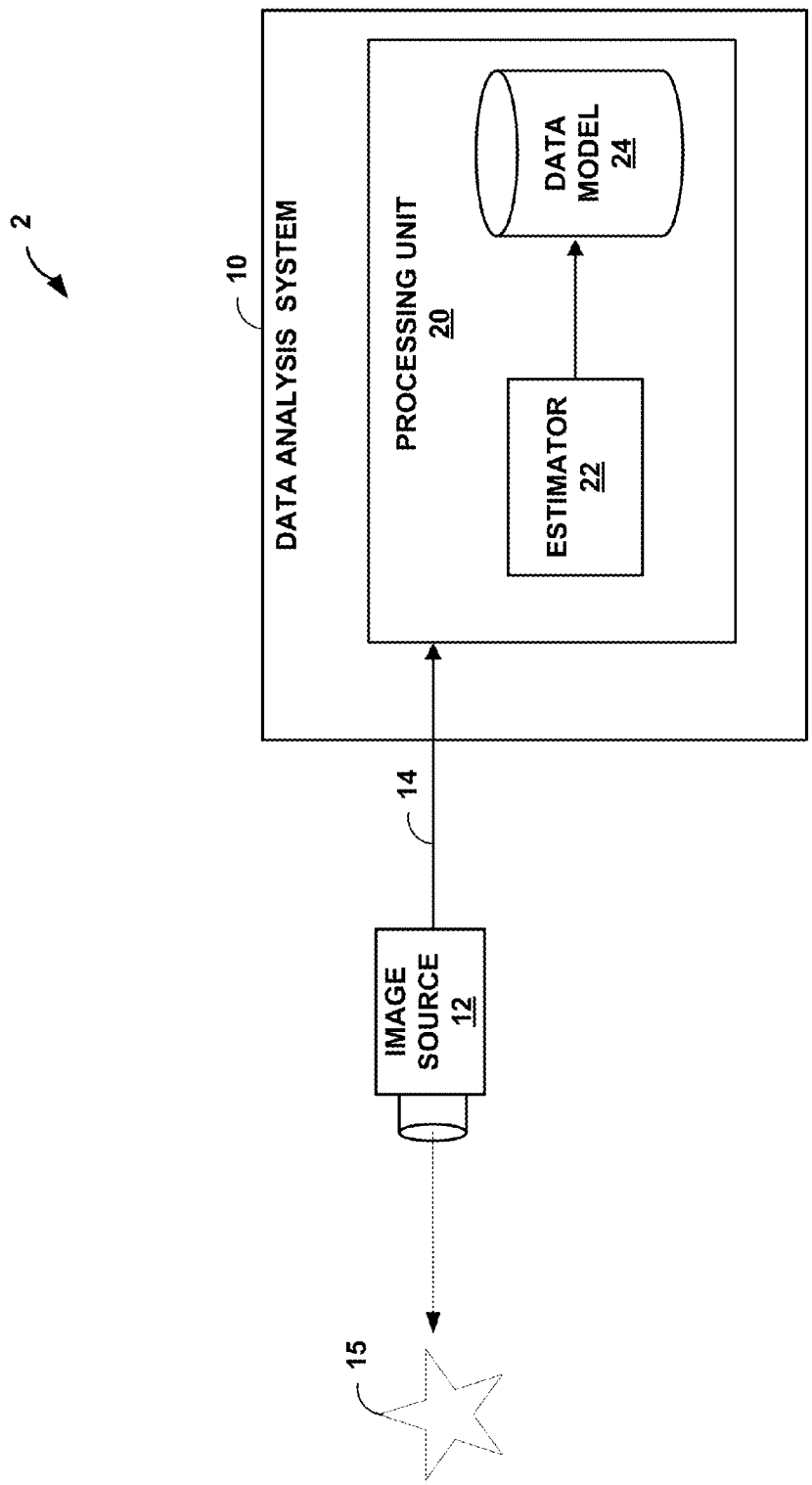
FIG. 1 is a block diagram illustrating an example data analysis system in which an estimator recovers a subspace from sampled data in accordance with the techniques described herein.

FIG. 1 is a block diagram illustrating a data analysis system 10 coupled to an image source 12. In the example of FIG. 1, image source images an environment having features 15 to produce image data 14. That is, image source 12 provides image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, and the like. Image data image data 14 generally comprises a set of data points conforming to a plurality of dimensions (D) and includes outlier data points, such as noise.

Estimator 22 of processing unit 20 process image data 14 to compute low-dimensional data model 24 representative of image data 14. Low dimensional data model 24 includes a reduced set of data points that conforms to a subspace having a reduced number of dimensions (d) less than the plurality of dimensions (D) of the set of data points. In this way, estimator 22 computes data model 24 of image data 14 by determining a low-dimensional subspace representative of the image data. Moreover, as described herein, estimator 22 computes data model 24 as an estimate of the underlying subspace in a manner that is resistance to any outliers within image data 14.

As further described herein, estimator 22 provides an iterative approach in which a convex minimization of image data 24 is formulated to robustly recover the subspace of image data 22, where the image data is contaminated with outlier data points in the form of noise. In each iteration, estimator 22 applies a scaling procedure to scale each data point computes an updated estimate for the subspace based on the scaled version of the data points. Estimator 22 determines, for each iteration, the scaled version of the set of data points by re-computing coefficients for the data points as a function of a proximity of each of the data points to the current estimate of the subspace. During each iteration, estimator 22 computes the updated estimate of the subspace based on a summation of weighted least absolute squares of the scaled version of the set of data points.

In general, image data 14 may be represented as a data set $X=\{x_i\}_{i=1}^N \subset \mathbb{R}^D$, for which the geometric median is the minimizer of the following function of $\in \mathbb{R}^D$:

$$\sum_{i=1}^N |y - x_i|, \quad (1)$$

where $\|\cdot\|$ denotes the Euclidean norm. This is a typical example of an M-estimator, that is, a minimizer of a function of the form $\Sigma_{i=1}^N \rho(r_i)$, where $r_i$ is a residual of the ith data point, $x_i$, from the parametrized object we want to estimate. Here $r_i = \|y-x_i\|$, $\rho(\chi)=|\chi|$ and we estimate $y \in \mathbb{R}^D$, which is parametrized by its D coordinates.

There are several obstacles in developing robust and effective estimators for subspaces. For purposes of example, estimators of linear subspaces are discussed and it is assumed that the data is centered at the origin. A main obstacle is due to the fact that the set of d-dimensional linear subspaces in $\mathbb{R}^D$, i.e., the Grassmannian G(D, d), is not convex. Therefore, a direct optimization on G(D, d) (or a union of G(D, d) over different d's) will not be convex (even not geodesically convex) and may result in several (or many) local minima. Another problem is that extensions of simple robust estimators of vectors to subspaces (e.g., using 11-type averages) can fail by a single far away outlier. For example, one may extend the d-dimensional geometric median minimizing (1) to the minimizer over $L \in G(D, d)$ of the function $$\sum_{i=1}^N |x_i - P_L x_i| \equiv \sum_{i=1}^N |P_L \perp x_i|, \quad (2)$$

where $L^\perp$ is the orthogonal complement of L and $P_L$ and $P_L \perp$ are the orthogonal projections on L and $L^\perp$ respectively. However, a single outlier with arbitrarily large magnitude will enforce the minimizer of (2) to contain it. The first obstacle can be resolved by applying a convex relaxation of the minimization of (2) so that subspaces are mapped into a convex set of matrices (the objective function may be adapted respectively).

A different convex relaxation is described herein that does not introduce arbitrary parameters and its implementation is significantly faster.

Described herein is a convex relaxation of the minimization of (2). The original minimization is over all subspaces L or equivalently all orthogonal projectors $P \equiv P_L \perp$. P with a D×D matrix satisfying $P^2=P$ and $P^T=P$ (where $\bullet^T$ denotes the transpose) can be identified. Since the latter set is not convex, it is relaxed to include all symmetric matrices, but avoid singularities by enforcing unit trace. That is, the set follow set may be minimized over:

$$H := \{Q \in R^{D \times D} : Q = Q^T, (Q) = 1\} \quad (3)$$

as follows $$\hat{Q} = \underset{Q \in H}{\arg\min} F(Q), \text{ where } F(Q) := \sum_{i=1}^N \|Qx_i\| \quad (4)$$

For the noiseless case (i.e., inliers lie exactly on L*), the subspace L* is estimated by $$\hat{L}:ker(\hat{Q}) \quad (5)$$

If the intrinsic dimension d is known (or can be estimate from the data), the subspace can be estimated by the span of the bottom d eigenvectors of $\hat{Q}$. This procedure is robust to sufficiently small levels of noise. This is referred to herein as the Geometric Median Subspace (GMS) algorithm and summarize in Algorithm 1.

Algorithm 1
The Geometric Median Subspace Algorithm

Input: $\chi = \{x_i\}_{i=1}^N \subseteq \mathbb{R}^D$: data, d: dimension of L*,
an algorithm for minimizing (4)
Output: $\hat{L}$: a d-dimensional linear subspace in $\mathbb{R}^D$.
 Steps:
  $\{v_i\}_{i=1}^d$ = the bottom d eigenvectors of $\hat{Q}$ (see (4))
  $\hat{L} = Sp(\{v_i\}_{i=1}^d)$ We remark that $\hat{Q}$ is semi-definite positive (we verify this later in Lemma 14). We can thus restrict $\mathbb{H}$ to contain only semi-definite positive matrices and thus make it even closer to a set of orthogonal projectors. Theoretically, it makes sense to require that the trace of the matrices in $\mathbb{H}$ is D−d (since they are relaxed versions of projectors onto the orthogonal complement of a d-dimensional subspace). However, scaling of the trace in (3) results in scaling the minimizer of (4) by a constant, which does not effect the subspace recovery procedure.

Equation (4) is an M-estimator with residuals $r_i = |Qx_i|$, $1 \leq i \leq N$, and $\rho(x) = |x|$. Unlike (2), which can also be seen as a formal M-estimator, the estimator $\hat{Q}$ is unique under a weak condition stated later.

The techniques described herein results in the following fundamental contributions to robust recovery of subspaces:

1. The proposed minimization can achieve exact recovery under some assumptions on the underlying data and without introducing an additional parameter.
2. A fast iterative algorithm for achieving this minimization having linear convergence is described.
3. The techniques provide state-of-the-art accuracy and speed of when compared with other methods on both synthetic and real data sets.
4. Robustness is established herein for the described method to noise and to a common regularization of IRLS algorithms.
5. Knowledge of the intrinsic dimension can be incorporated or estimated empirically.
6. When replacing the sum of norms in (4) by the sum of squares of norms, the modified minimizer $\hat{Q}$ is a scaled version of the empirical inverse covariance. The subspace spanned by the bottom d eigenvectors is clearly the d-dimensional subspace obtained by PCA. The original minimizer of (4) can thus be interpreted as a robust version of the inverse covariance matrix.
7. Previous and well-known M-estimators do not solve the subspace recovery problem under a common assumption.

Exact Recovery and Conditions for Exact Recovery by GMS

In order to study the robustness to outliers of our estimator for the underlying subspace, formulate the exact subspace recovery problem is formulated. This problem assumes a fixed d-dimensional linear subspace L*, inliers sampled from L* and outliers sampled from its complement; it asks to recover L* as well as identify correctly inliers and outliers.

In the case of point estimators, like the geometric median minimizing (1), robustness is commonly measured by the breakdown point of the estimator. Roughly speaking, the breakdown point measures the proportion of arbitrarily large observations (that is, the proportion of "outliers") an estimator can handle before giving an arbitrarily large result. For example, the breakdown point of the geometric median is 50%.

In the case of estimating subspaces, this definition cannot be directly extended since the set of subspaces, i.e., the Grassmannian (or unions of it), is compact, so "an arbitrarily large result", that is, a subspace with arbitrarily large distance from all other subspaces, cannot be described. Furthermore, given an arbitrarily large data point, a subspace containing it can always be formed; that is, this point is not arbitrarily large with respect to this subspace. Instead, the outliers are identified as the ones in the compliment of L* and the techniques focus on the largest fraction of outliers (or smallest fraction of inliers per outliers) allowing exact recovery of L*. Whenever an estimator can exactly recover a subspace under a given sampling scenario, it is viewed herein as robust and its effectiveness can be measured by the largest fraction of outliers it can tolerate. However, when an estimator cannot exactly recover a subspace, one needs to bound from below the distance between the recovered subspace and the underlying subspace of the model. Alternatively, one would need to point out at interesting scenarios where exact recovery cannot even occur in the limit when the number of points approaches infinity.

In one example, in order to guarantee exact recovery of our estimator, three kinds of restrictions are applied to the underlying data, which are explained herein. First of all, the inliers need to permeate through the whole underlying subspace L*, in particular, they cannot concentrate on a lower dimensional subspace of L*. Second of all, outliers need to permeate throughout the whole complement of L*. Some practical methods are also suggested to avoid this failure mode when d is unknown. Third of all, the "magnitude" of outliers needs to be restricted. All data points may be initially scaled to the unit sphere in order to avoid extremely large outliers. However, outliers concentrating along lines, which may have an equivalent effect of a single arbitrarily large outlier, still need to be avoided.

FIGS. 2A-2D demonstrate cases where these assumptions are not satisfied.

In the case where d is known, a tight convex relaxation of the minimization of (31) over all projectors $P_{L^\perp}$ of rank d may be used. An optimizer, refered to as the REAPER (of the needle-in-haystack problem) minimize the same function F(Q) (see (4)) over the set $$H' = \left\{ Q \in R^{D \times D} : Q = Q^T, (Q) = 1, |Q| \leq \frac{1}{D-d} \right\}.$$

Further details of the REAPER algorithm are described in G. Lerman, M. McCoy, J. A. Tropp, and T. Zhang. "*Robust computation of linear models, or How to find a needle in a haystack*," ArXiv e-prints, February 2012, the entire contents of which is incorporated herein by reference.

The underlying subspace may be estimated by the bottom d eigenvectors of the REAPER. The new constraints in H' result elegant conditions for exact recovery and tighter probabilistic theory (due to the tighter relaxation). Since d is known, any failure mode of GMS is avoided. The REAPER algorithm for computing the REAPER is based on the IRLS procedure described herein with additional constraints, which complicate its analysis.

While the REAPER framework applies a tighter relaxation, the GMS framework still has several advantages over the REAPER framework. First of all, in various practical situations the dimension of the data is unknown and thus REAPER is inapplicable. On the other hand, GMS can be used for dimension estimation, demonstrated below. Second of all, the GMS algorithm described herein is faster than REAPER (the REAPER requires additional eigenvalue decomposition of a D×D matrix at each iteration of the IRLS algorithm). Third of all, when the failure mode of GMS is avoided, the empirical performances of REAPER and GMS are usually comparable (while GMS is faster). At last, GMS and REAPER have different objectives with different consequences. REAPER aims to find a projector onto the underlying subspace. On the other hand, GMS aims to find a "generalized inverse covariance" and is formally similar to other common M-estimators. Therefore, the eigenvalues and eigenvectors of the GMS estimator (i.e., the "generalized inverse covariance") can be interpreted as robust eigenvalues and eigenvectors of the empirical covariance.

Exact and Near Subspace Recovery by the Minimization (4)

Problem Formulation

The formulation of the exact subspace recovery problem, which is a robust measure for the performance of the estimator, is repeated below. Image data 14 conforms to, in this example, a linear subspace $L^* \in G(D, d)$ and comprises a data set $\chi = \{x_i\}_{i=1}^N$, which contains inliers sampled from L* and outliers sampled from $R^D \setminus L^*$. Given the data set χ and no other information, the objective of the exact subspace recovery problem is to exactly recover the underlying subspace L*.

In the noisy case (where inliers do not lie on L*, but perturbed by noise), the techniques investigate near subspace recovery, i.e., recovery up to an error depending on the underlying noise level. In this case, additional information on the model may be needed. In some example implementations, dimensionality d of the subspace may be know estimated from the data.

Common Difficulties with Subspace Recovery

FIGS. 2A-2D are graphs illustrating three typical enemies of subspace recovery. These typical enemies are described below and exemplified in.

Figure 2A:
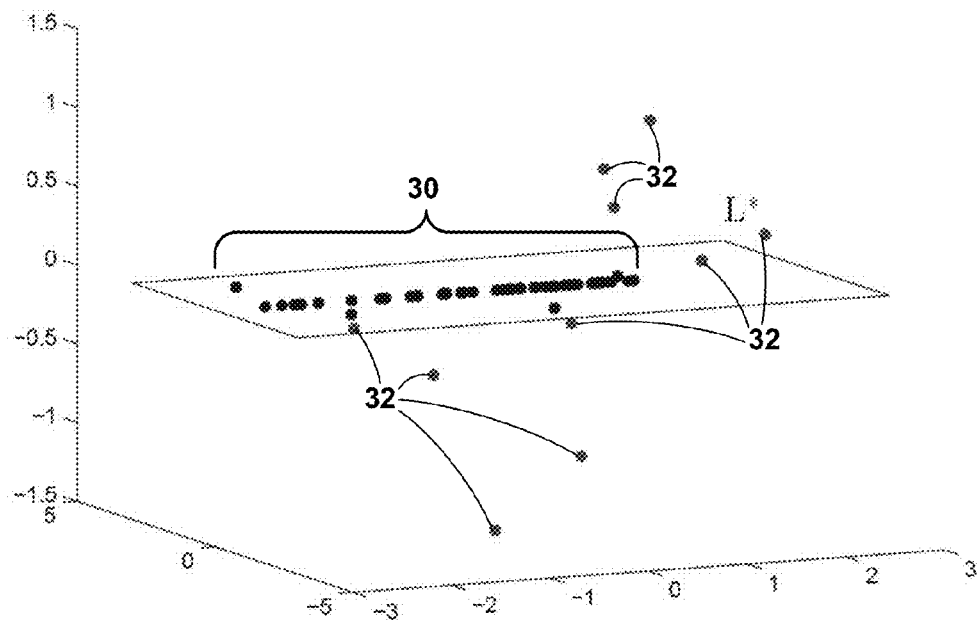
FIGS. 2A-2D are graphs illustrating three typical enemies of subspace recovery.

FIG. 2A is a graph showing an example of a type 1 enemy: L* is a plane represented by a rectangle, "inliers" 30 (in L*) and "outliers" 32 (in $R^3\backslash L^*$). Most inliers 30 lie on a line inside L*. It seems unlikely to distinguish between inliers 30, which are not on "the main line", and the outliers 32. It is thus likely to recover the main line instead of L*. A type 1 enemy occurs when the inliers 30 are mainly sampled from a subspace $L' \subset L^*$. In this case, it seems impossible to recover L*. One may expect a good algorithm to recover L' (instead of L*) or a subspace containing it with slightly higher dimension (see for example FIG. 2A). Some techniques have addressed this issue by requiring incoherence conditions for the inliers. For example, if m and N−m points are sampled from L' and $L^* \backslash L'$ respectively, then the incoherency condition requires that $\mu \geq N/(\dim(L^*)\cdot(N-m))$, where $\mu$ is an incoherency parameter.

Figure 2B:
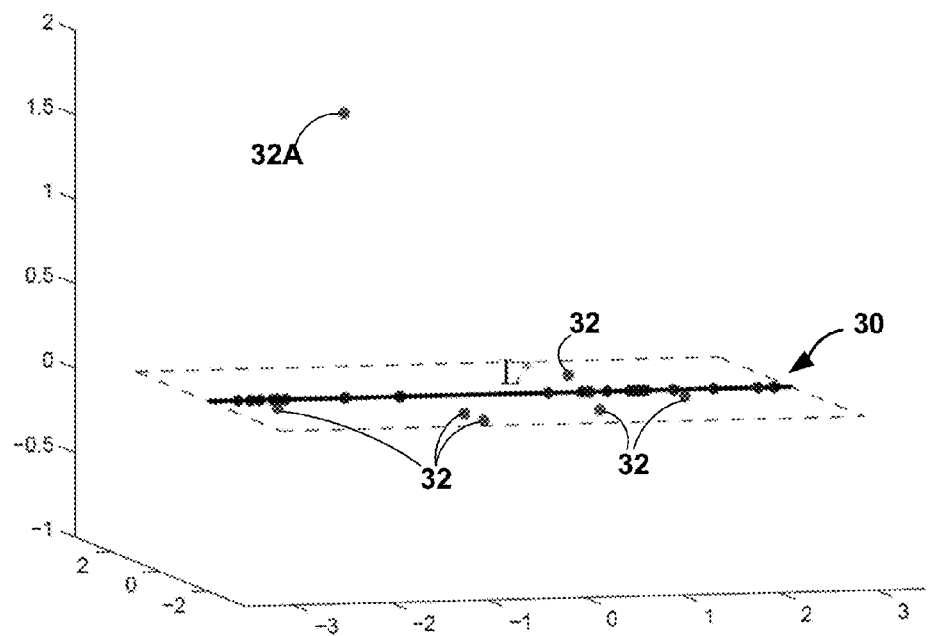

FIG. 2B is a graph illustrating an example of a type 2 enemy: L* is a line represented by a black line segment, "inliers" 30 (in L*) and "outliers" (in $R^3\backslash L^*$) 32. All outliers 32 but one 32A lie within a plane containing L*, which is represented by a dashed rectangle. There seems to be stronger distinction between the points on this plane and the isolated outlier than the original inliers and outliers. Therefore, an exact recovery algorithm may output this plane instead of L*. A type 2 enemy occurs when the outliers are mainly sampled from a subspace L such that $\dim(L \oplus L^*) < D$. In this case $L^* \tilde{\oplus} L$ can be mistakenly identified as the low-rank subspace (see for example FIG. 2B). This is a main issue when the intrinsic dimension is unknown; if on the other hand the intrinsic dimension is known, then one can often overcome this enemy.

Figure 2C:
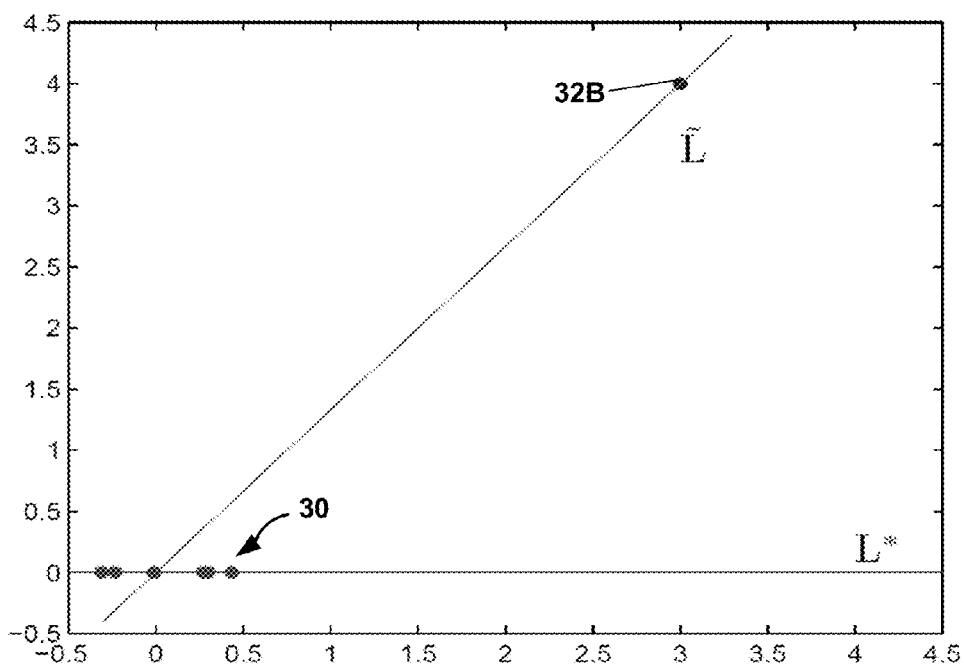
Figure 2D:
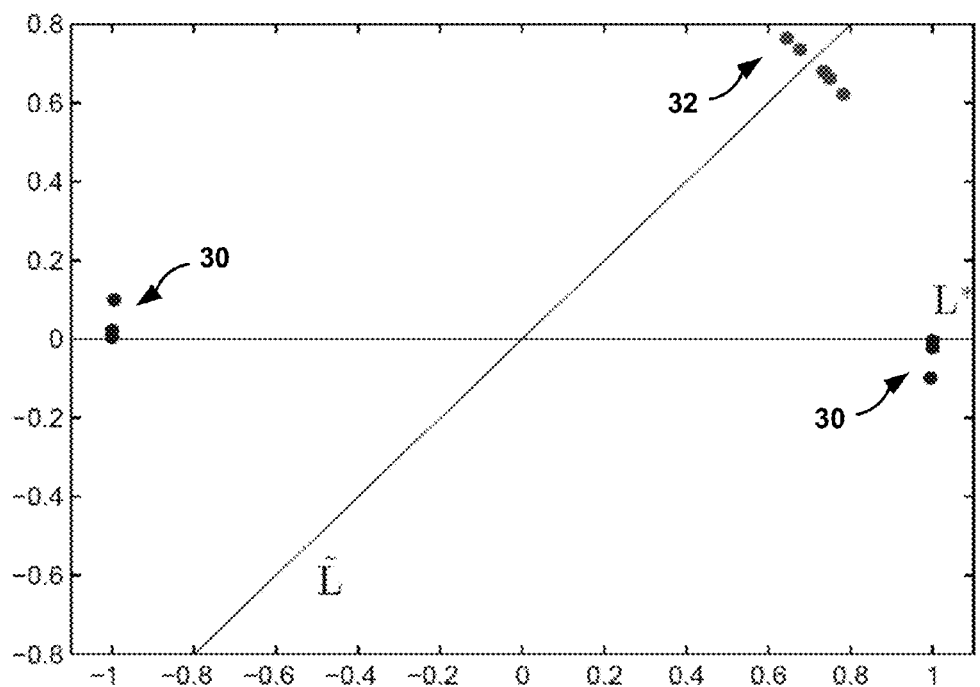

FIG. 2C is a graph that illustrates an example 1 of a type 3 enemy: The inliers 30 lie on the line L* and there is a single outlier 32B with relatively large magnitude. An exact recovery algorithm can output the (determined by the outlier) instead of L*. If the data is normalized to the unit circle, then any reasonable robust subspace recovery algorithm can still recover L*. FIG. 2D is a graph that illustrates an example 2 of a type 3 enemy: Data points are normalized to lie on the unit circle, inliers 30 lie around the line L* and outliers 32 concentrate around another line, L. A subspace recovery algorithm can output L instead of L*. A type 3 enemy occurs due to large magnitudes of outliers. For example, a single outlier 32B with arbitrarily large magnitude will be contained in the minimizer of (2), which will thus be different than the underlying subspace (see for example FIG. 2C). Also, many outliers 32 with not-so-small magnitudes that lie around a fixed line may have the effect of a single large outlier (see for example FIG. 2D).

Another issue of exact subspace recovery is whether the subspace obtained by a proposed algorithm is unique. Many of the convex algorithms depend on convex $l_1$-type methods that may not be strictly convex. But it may still happen that in the setting of pure inliers and outliers and under some conditions avoiding the three types of enemies, the recovered subspace is unique (even though it may be obtained by several non-unique minimizers). Nevertheless, uniqueness of our minimizer (and not the recovered subspace) is important for analyzing the numerical algorithm approximating it and for perturbation analysis (e.g., when considering near recovery with noisy data).

Conditions for Handling the Three Enemies

Additional assumptions are introduced on the data to address the three types of enemies. The sets of exact inliers and outliers are denoted by $\chi_1$ and $\chi_0$ respectively, i.e., $\chi_1 = \chi \cap L^*$ and $\chi_0 = \chi \backslash L^*$. The following two conditions simultaneously address both type 1 and type 3 enemies:

$$\min_{Q \in H, QP_{L^{*\perp}}=0} \sum_{x \in \chi_1} |Qx| > \sqrt{2} \min_{v \in L^{*\perp}, |v|=1} \sum_{x \in \chi_0} |v^T x|, \quad (6)$$

$$\min_{Q \in H, QP_{L^{*\perp}}=0} \sum_{x \in \chi_1} |Qx| > \sqrt{2} \max_{v \in L^*, |v|=1} \sum_{x \in \chi_0} |v^T x|. \quad (7)$$

A lower bound on the common LHS of both (6) and (7) is designed to avoid type 1 enemies. This common LHS is a weak version of the permeance statistics, which can be defined as follows:

$$P(L^*) := \min_{0 \neq u \in L^*, |u|=1} \sum_{x \in \chi_1} |u^T x|.$$

Similarly to the permeance statistics, it is zero if and only if all inliers are contained in a proper subspace of L*. Indeed, if all inliers lie in a subspace $L' \subset L^*$, then this common LHS is zero with the minimizer $Q = P_{L^{*\perp} \cap L^*}/(P_{L^{*\perp} \cap L^*})$. Similarly, if it is zero, then $Qx = 0$ for any $x \in \chi_1$ and for some Q with kernel containing $L^{*\perp}$. This is only possible when $\chi_1$ is contained in a proper subspace of L*. Similarly to the permeance statistics, if the inliers nicely permeate through L*, then this common LHS clearly obtain large values.

The upper bounds on the RHS's of (6) and (7) address two complementing type 3 enemies. If $\chi_0$ contains few data points of large magnitude, which are orthogonal to L*, then the RHS of (6) may be too large and (6) may not hold. If on the other hand $\chi_0$ contains few data points with large magnitude and a small angle with L*, then the RHS of (7) will be large so that (7) may not hold. Conditions (6) and (7) thus complete each other.

The RHS of condition (7) is similar to the linear structure statistics (for L*), which was defined in (3.3) of LMTZ2012. The linear structure statistics uses an $l_2$ average of dot products instead of the $l_1$ average used here and was applied in this context to $R^D$ (instead of L*) in Lerman et al. Similarly to the linear structure statistics, the RHS of (7) is large when outliers either have large magnitude or they lie close to a line (so that their combined contribution is similar to an outlier with a very large magnitude as exemplified in FIG. 2D. The RHS of condition (7) is a very weak analog of the linear structure statics of $L^{*\perp}$ since it uses a minimum instead of a maximum. There are some significant outliers within $L^{*\perp}$ that will not be avoided by requiring (7). For example, if the codimension of L* is larger than 1 and there is a single outlier with an arbitrary large magnitude orthogonal to L*, then the RHS of (7) is zero.

The next condition avoids type 2 enemies and also significant outliers within $L^{*\perp}$ (i.e., type 3 enemies) that were not avoided by condition (7). This condition requires that any minimizer of the following oracle problem $$\hat{Q}_0 := \underset{Q \in H, QP_{L*}=0}{\arg\min} F(Q) \quad (8)$$

satisfies $$\text{rank}(\hat{Q}_0) = D-d. \quad (9)$$

The requirement that $QP_{L^*}=0$ is equivalent to the condition $\ker(Q) \supseteq L^*$ and therefore the rank of the minimizer is at most $D-d$. Enforcing the rank of the minimizer to be exactly $D-d$ restricts the distribution of the projection of $\chi$ onto $L^{*\perp}$. In particular, it avoids its concentration on lower dimensional subspaces and is thus suitable to avoid type 2 enemies. Indeed, if all outliers are sampled from $L \subset L^{*\perp}$, then any $Q \in H$ with $\ker(Q) \supseteq L+L^*$ satisfies $F(Q)=0$ and therefore it is a minimizer of the oracle problem (4), but it contradicts (9).

This condition also avoids some type 3 enemies, which were not handled by conditions (6) and (7). For example, any $D-d-1$ outliers with large magnitude orthogonal to $L^*$ will not be excluded by requiring (6) or (7), but will be avoided by (9).

This condition is restrictive though, especially in very high ambient dimensions. Indeed, it does not hold when the number of outliers is smaller than $D-d$ (since then the outliers are sampled from some $L$ with $\dim(L \oplus L^*)<D$). How to avoid this condition when knowing the dimension is described below. In addition, some practical solutions to overcome the corresponding restrictive lower bound on the number of outliers when the dimension is unknown is also described below.

Example 1

This example demonstrates the violation of the conditions above for the examples depicted in FIGS. 2A-2D. The actual calculations rely on the concepts described herein. For example, in FIG. 2A which represents a type 1 enemy, both conditions (6) and (7) are violated. Indeed, the common LHS of (6) and (7) is 5.69, whereas the RHS of (6) is 8.57 and the RHS of (7) is larger than 10.02 (this lower bound is obtained by substituting $v=[0,1,0]$ in the RHS of (7); note that v is a unit vector in $L^*$).

In FIG. 2B which represents a type 2 enemy, condition (9) is violated. Indeed, a solution $\hat{Q}_0$ with rank $(\hat{Q}_0)=1 \neq D-d=2$ is obtained numerically. It can be proved in this case that $\hat{Q}_0$ is the projector onto the orthogonal complement of the plane represented by the dashed rectangle.

In FIG. 2C, which represents a type 3 enemy, both conditions (6) and (7) are violated. Indeed, the common LHS of (6) and (7) is 1.56 and the RHS's of (6) and (7) are 5.66 and 4.24 respectively. However, all points are normalized to lie on the unit circle, this enemy can be overcome. Indeed, for the normalized data, the common LHS of (6) and (7) is 6 and the RHS's of (6) and (7) are 1.13 and 0.85 respectively.

In the example of FIG. 2D, which also represents a type 3 enemy, both conditions (6) and (7) are violated. Indeed, the LHS of (6) and (7) are 5.99 and the RHS's of (6) and (7) are 6.91 and 7.02 respectively.

Exact Recovery Under Combinatorial Conditions

This section discusses that that the minimizer of (4) solves the exact recovery problem under the above combinatorial conditions.

Theorem 1: Assume that $d$, $D \in \mathbb{N}$, $d<D$, X is a data set in $\mathbb{R}^D$ and $L^* \in G(D, d)$. If conditions (6), (7) and (9) hold (w.r.t. X and $L^*$), then any minimizer of (4) $\hat{Q}_0$, recovers the subspace $L^*$ in the following way: $\ker \hat{Q}_0 = L^*$. If only (6) and (7) hold, then $\ker \hat{Q}_0 \supseteq L^*$.

Uniqueness of the Minimizer

Theorem 1 implies that if (6), (7) and (9) hold, then $\ker \hat{Q}$ is unique. The uniqueness of is is guaranteed independently of the exact subspace recovery problem.

Theorem 2: If the following condition holds: $\{\chi \cap L_1\} \cup \{X \cap L_2\} \neq X$ for all (D-1)-dimensional subspace $L_1, L_2 \in \mathbb{R}^D$, then $F(Q)$ is a strictly convex function on $\mathbb{H}$.

Weaker Alternatives of Conditions (6) and (7)

It is sufficient to guarantee exact recovery by requiring (9) and that for an arbitrarily chosen solution of (8), $\hat{Q}_0$, the following two conditions are satisfied (as long as they are well-defined):

$$\min_{Q \in H, QP_{L^{*\perp}}=0} \sum_{x \in \chi_1} |Qx| > \sqrt{2} \left\| \sum_{x \in \chi_0} \hat{Q}_0 x x^T P_{L^{*\perp}} / \|\hat{Q}_0 x\| \right\| \quad (10)$$

and $$\min_{Q \in H, QP_{L^{*\perp}}=0} \sum_{x \in \chi_1} |Qx| > \sqrt{2} \left\| \sum_{x \in \chi_0} \hat{Q}_0 x x^T P_{L^*} / \|\hat{Q}_0 x\| \right\|. \quad (11)$$

Condition (9) guarantees that $\hat{Q}_0 x \neq 0$ for all $x \in \chi_0$ and thus the RHS's of (11) and (12) are well-defined.

Conditions (11) and (12) can be verified when $\chi_0, \chi_1$ and $L^*$ are known (unlike (6) and (7)), where $\hat{Q}_0$ can be found by Algorithm 2. Furthermore, (11) and (12) are weaker than (6) and (7), though they are more technically involved and harder to motivate.

In order to demonstrate the near-tightness of (11) and (12), we formulate the following necessary conditions for the recovery of $L^*$ as $\ker(\hat{Q})$. For an arbitrarily chosen solution of (8), $\hat{Q}_0$:

$$\min_{Q \in H, QP_{L^{*\perp}}=0} \sum_{x \in \chi_1} |Qx| > \left\| \sum_{x \in \chi_0} \hat{Q}_0 x x^T P_{L^{*\perp}} / \|\hat{Q}_0 x\| \right\| \quad (12)$$

and $$\sum_{x \in \chi_1} |Q(P_{L^*} x)| \geq \sum_{x \in \chi_0} \langle \hat{Q}, P_{L^{*\perp}}^T \hat{Q}_0 x x^T P_{L^*} / \|\hat{Q}_0 x\| \rangle_F \text{ for any } Q \in \quad (13)$$

$$\mathbb{R}^{(D-d) \times d},$$

where for matrices $A$, $B \in \mathbb{R}^{k \times l}$: $\langle A, B \rangle_F = (AB^T)$ is the Frobenius dot product. Indeed, conditions (13) and (14) are close to conditions (11) and (12). In particular, (13) and (11) are only different by the constant factor $\sqrt{2}$, that is, (11) is practically tight.

Exact Recovery under Probabilistic Models

The conditions for exact recovery (or the main two of them) and the condition for uniqueness of the minimizer $\hat{Q}$ hold with high probability under basic probabilistic models. Such a probabilistic theory is cleaner when the outliers are sampled from a spherically symmetric distribution as demonstrate herein (with two different models). One issue is that when the outliers are spherically symmetric then various non-robust algorithms (such as PCA) can asymptotically approach exact recovery and nearly recover the underlying subspace with sufficiently large sample. It is shown herein how the theory presented can be slightly modified to establish exact recovery of the GMS algorithm in an asymmetric case, where PCA cannot even nearly recover the underlying subspace.

Cases with Spherically Symmetric Distributions of Outliers

First, we assume a more general probabilistic model. We say that $\mu$ on $\mathbb{R}^D$ is an Outliers-Inliers Mixture (OIM) measure (w.r.t. the fixed subspace $L^* \in G(D,d)$) if $\mu = \alpha_0 \mu_0 + \alpha_1 \mu_1$, where $\alpha_0, \alpha_1 > 0$, $\alpha_0 + \alpha_1 = 1$, $\mu_1$ is a sub-Gaussian probability measure and $\mu_0$ is a sub-Gaussian probability measure on $\mathbb{R}^D$ (representing outliers) that can be decomposed to a product of two independent measures $\mu_0 = \mu_{0,L^*} \times \mu_{0,L^{*\perp}}$ such that the supports of $\mu_{0,L^*}$ and $\mu_{0,L^{*\perp}}$ are $L^*$ and $L^{*\perp}$ respectively, and $\mu_{0,L^{*\perp}}$ is spherically symmetric with respect to rotations within $L^{*\perp}$.

To provide cleaner probabilistic estimates, we also invoke a needle-haystack model that assumes that both $\mu_0$ and $\mu_1$ are the Gaussian distributions: $\mu_0 = N(0, \sigma_0^2 I/D)$ and $\mu_1 = N(0, \sigma_1^2 P_{L^*} P^T_{L^*}/d)$ (the factors $1/D$ and $1/d$ normalize the magnitude of outliers and inliers respectively so that their norms are comparable). While this assumes a fixed number of outliers and inliers independently sampled from $\mu_0$ and $\mu_1$ respectively, here we independently sample from the mixture measure $\mu = \alpha_0 \mu_0 + \alpha_1 \mu_1$; we refer to $\mu$ as a needle-haystack mixture measure.

In order to prove exact recovery under any of these models, one needs to restrict the fraction of inliers per outliers (or equivalently, the ratio $\alpha_1/\alpha_0$). We refer to this ratio as SNR (signal to noise ratio) since we may view the inliers as the pure signal and the outliers as some sort of "noise". For the needle-haystack model, we require the following SNR:

$$\frac{\alpha_1}{\alpha_0} > 4 \frac{\sigma_0}{\sigma_1} \frac{d}{\sqrt{(D-d)D}}. \tag{15}$$

We later explain how to get rid of the term $\sigma_1/\sigma_0$. For the OIM model we assume the following more general condition:

$$\alpha_1 \min_{Q \in H, QP_{L^{*\perp}}=0} \int |Qx| d\mu_1(x) > 2\sqrt{2} \frac{\alpha_0}{D-d} \int |P_{L^{*\perp}} x| d\mu_0(x) \tag{16}$$

Under the needle-haystack model, this condition is a weaker version of (15). That is, Lemma 3 If $\mu$ is a needle-haystack mixture measure, then (15) implies (16).

For samples from an OIM measure satisfying (16), we can establish our modified conditions of unique exact recovery (i.e., (11), (12) and (9)) with overwhelming probability in the following way (we also guarantee the uniqueness of the minimizer $\hat{Q}$).

Theorem 4 If X is an i.i.d. sample from an OIM measure $\mu$ satisfying (16), then conditions (11), (12), and (9) hold with probability $1-C \exp(-N/C)$, where C is a constant depending on $\mu$ and its parameters. Moreover, (10) hold with probability 1 if there are at least 2D−1 outliers (i.e., the number of points in $X/L^*$ is at least 2D−1)

Under the needle-haystack model, the SNR established by Theorem 4 is comparable to the best SNR among other convex exact recovery algorithms. However, the probabilistic estimate under which this SNR holds is rather loose and thus its underlying constant C is not specified. Indeed, the proof of Theorem 4 uses $\epsilon$-nets and union-bounds arguments, which are often not useful for deriving tight probabilistic estimates. One may thus view Theorem 4 as a near-asymptotic statement.

The statement of Theorem 4 does not contradict our previous observation that the number of outliers should be larger than at least D−d. Indeed, the constant C is sufficiently large so that the corresponding probability is negative when the number of outliers is smaller than D−d.

In the next theorem, we assume only a needle-haystack model and thus we can provide a stronger probabilistic estimate based on the concentration of measure phenomenon. However, the SNR is worse than the one in Theorem 4 by a factor of order $\sqrt{D-d}$. This is because we are unable to estimate $\hat{Q}_0$ of (8) by concentration of measure. Similarly, in this theorem we do not estimate the probability of (9) (which also involves $\hat{Q}_0$). Nevertheless, we observed in experiments that (9) holds with high probability for $N_0 = 2(D-d)$ and the probability seems to go to 1 as $N_0 = 2(D-d)$ and $D-d \to \infty$. Moreover, one of the algorithms proposed below (EGMS) does not require condition (9).

Theorem 5 If X is an i.i.d. sample of size N from a needle-haystack mixture measure $\mu$ and if $$\frac{\alpha_1}{\alpha_0} > \frac{\sigma_0}{\sigma_1} \frac{\sqrt{2/\pi} - 1/4 - 1/10}{\sqrt{2/\pi} + 1/4 + 1/10} \sqrt{\frac{d^2}{D}} \tag{17}$$

And $$N > 64 \max(2d/\alpha_1, 2d/\alpha_0, 2(D-d)/\alpha_0), \tag{18}$$

Then (6) and (7) hold with probability $1 - e^{-\alpha_1^2 N/2} - 2e^{-\alpha_0^2 N/2} - e^{-\alpha_0 N/800}$.

A Special Case with Asymmetric Outliers

In the case of spherically symmetric outliers, PCA cannot exactly recover the underlying subspace, but it can asymptotically recover it. In particular, with sufficiently large sample with spherically symmetric outliers, PCA nearly recovers the underlying subspace. We thus slightly modify the two models described above so that the distribution of outliers is asymmetric and show that our combinatorial conditions for exact recovery still hold (with overwhelming probability). On the other hand, the subspace recovered by PCA, when sampling data from these models, is sufficiently far from the underlying subspace for any given sample size.

We first generalize Theorem 5 under a generalized needle-haystack model: Let $\mu = \alpha_0 \mu_0 + \alpha_1 \mu_1$, $\mu_0 = N(0, \Sigma_0/D)$, where $\Sigma_0$ is an arbitrary positive definite matrix (not necessarily a scalar matrix as before), and as before $\mu_1 = N(0, \sigma_1^2 P_{L^*} P^T_{L^*}/d)$. We claim that Theorem 5 still holds in this case if we replace $\sigma_0$ in the RHS of (17) with $\sqrt{\lambda_{max}(\Sigma_0)}$, where $\lambda_{max}(\Sigma_0)$ denotes the largest eigenvalue of $\Sigma_0$.

In order to generalize Theorem 4 for asymmetric outliers, we assume that the outlier component $\mu_0$ of the OIM measure $\mu$ is a sub-Gaussian distribution with an arbitrary positive definite covariance matrix $\Sigma_0$. Following Coudron and Lerman (2012), we define the expected version of F, $F_I$ and its oracle minimizer, $\hat{Q}_I$ which is analogous to (8) (the subscript I indicates integral):

$$F_I(Q) = \int |Qx| d\mu(x) \tag{19}$$

and $$\hat{Q}_I = \varrho \in H, Q P_{L^{*\perp}}=0 F_I(Q). \tag{20}$$

We assume that $\hat{Q}_I$ is the unique minimizer in (20) (we remark that the two-subspaces criterion in (25) for the projection of $\mu$ onto $L^{*\perp}$ implies this assumption). Under these assumptions Theorem 4 still holds if we multiply the RHS of (16) by the ratio between the largest eigenvalue of $P_{L^{*\perp}}\hat{Q}_{I}P_{L^{*\perp}}$ and the (D–d)th eigenvalue of $P_{L^{*\perp}}\hat{Q}_{I}P_{L^{*\perp}}$.

Near Subspace Recovery for Noisy Samples

We show that in the case of sufficiently small additive noise (i.e., the inliers do not lie exactly on the subspace L* but close to it), the GMS algorithm nearly recovers the underlying subspace.

We use the following notation: $\|A\|_F$ and $\|A\|$ denote the Frobenius and spectral norms of $A \in \mathbb{R}^{k \times l}$ respectively. Furthermore, $\mathbb{H}_1$ denotes the set of all positive semidefinite matrices in $\mathbb{H}$, that is, $H_1 = \{Q \in H : Q \geq 0\}$. We also define the following two constants $$\gamma_0 = \frac{1}{N} \min_{Q \in H_1, |\Delta|_F=1, (\Delta)=0} \sum_{i=1}^{N} \frac{|\Delta x_i|^2 |Qx_i|^2 - (x_i^T \Delta Q x_i)^2}{|Qx_i|^3}, \quad (21)$$

and $$\gamma_0' = \frac{1}{N} \min_{Q \in H_1, |\Delta|=1, (\Delta)=0} \sum_{i=1}^{N} \frac{|\Delta x_i|^2 |Qx_i|^2 - (x_i^T \Delta Q x_i)^2}{|Qx_i|^3}. \quad (22)$$

The sum in the RHS's of (21) and (22) is the following second directional derivative: $d^2/dt^2 F(Q+t\Delta)$; when $Qx_i = 0$, its ith term can be set to 0. It is interesting to note that both (21) and (22) express a Restricted Strong Convexity (RSC) parameter $\gamma_l$. The difference between $\gamma_0$ and $\gamma_0'$ of (21) and (22) is due to the choice of either the Frobenius or the spectral norms respectively for measuring the size of $\Theta - \Theta'$.

Using this notation, we formulate our noise perturbation result as follows.

Theorem 6 Assume that $\{\epsilon_i\}_{i=1}^N$ is a set of positive numbers, $X = \{X_i\}_{i=1}^N$ and Let $F_x(Q)$ and $F_{\tilde{X}}(Q)$ denote the corresponding versions of F(Q) w.r.t. the sets X and $\tilde{X}$ and let $\hat{Q}$ and $\tilde{Q}$ denote their respective minimizers. Then we have $$\|\tilde{Q} - \hat{Q}\|_F < \sqrt{2 \sum_{i=1}^{N} \epsilon_1 / (N\gamma_0)} \text{ and} \quad (23)$$

$$\|\tilde{Q} - \hat{Q}\| < \sqrt{2 \sum_{i=1}^{N} \epsilon_1 / (N\gamma'_0)}$$

Moreover, if $\tilde{L}$ and $\hat{L}$ are the subspaces spanned by the bottom d eigenvectors of $\hat{Q}$ and $\tilde{Q}$ respectively and $v_{D-d}$ is the (D–d)th eigengap of $\hat{Q}$, then $$\|P_{\tilde{L}} - P_{\hat{L}}\|F \leq \frac{\sqrt[2]{2\sum_{i=1}^N \epsilon_i /(N\gamma_0)}}{v_{D-d}} \text{ and} \quad (24)$$

$$\|P_{\tilde{L}} - P_{\hat{L}}\| \leq \frac{\sqrt[2]{2\sum_{i=1}^N \epsilon_i /(N\gamma'_0)}}{v_{D-d}}$$

We note that if $\chi$ and $\tilde{\chi}$ satisfy the conditions of Theorem 6, then given the perturbed data set $\tilde{\chi}$ and the dimension d, Theorem 6 guarantees that GMS nearly recovers L*. More interestingly, the theorem also implies that we may properly estimate the dimension of the underlying subspace in this case. Such dimension estimation is demonstrated later in FIGS. 3A-3B.

Theorem 6 is a perturbation result. We note that asymptotically the bounds on the recovery errors in (23) and (24) depend only on the empirical mean of $\{\epsilon_i\}_{i=1}^N$ and do not grow with N. To clarify this point we formulate the following proposition.

Proposition 7 If X is i.i.d. sampled from a bounded distribution $\mu$ and $$\mu(L_1) + \mu(L_2) < 1 \text{ for any two D-1-dimensional subspaces } L_1 \text{ and } L_2, \quad (25)$$

Then there exists constants $c_0(\mu) > 0$ and $c'_0(\mu) > 0$ depending on $\mu$ such that $$\liminf_{N \to \infty} \gamma 0(X) \geq c_0(\mu) \text{ and } \liminf_{N \to \infty} \gamma' 0(X) \geq c'_0(\mu) \text{ almost surely.} \quad (26)$$

We first note that the bounds in Theorem 6 are generally not optimal. Indeed, if $\epsilon_i = O(\epsilon)$ for all $1 \leq i \leq N$, then the error bounds in Theorem 6 are $O(\sqrt{\epsilon})$, whereas we empirically noticed that these error bounds are $O(\epsilon)$.

The dependence of the error on D, which follows from the dependence of $\gamma_0$ and $\gamma_0'$ on D, is a difficult problem and strongly depends on the underlying distribution of $\chi$ and of the noise. For example, in the very special case where the set $\chi$ is sampled from a subspace $L_0 \in \mathbb{R}^D$ of dimension $D_0 < D$, and the noise distribution is such that $\tilde{\chi}$ also lies in $L_0$, then practically we are performing GMS over $P_{L_0}(\chi)$ and $P_{L_0}(\tilde{\chi})$, and the bound in (23) would depend on $D_0$ instead of D.

Near Subspace Recovery for Regularized Minimization

For our practical algorithm it is advantageous to regularize the function F as follows (see Theorems 11 and 12 below):

$$f_\delta(Q) := \sum_{i=1, \|Qx_i\| \geq \delta}^N \|Qx_i\| + \sum_{i=1, \|Qx_i\| < \delta}^N \left( \frac{\|Qx_i\|^2}{2\delta} + \frac{\delta}{2} \right). \quad (27)$$

In order to address the regularization in our case and conclude that the GMS algorithm nearly recovers L* for the regularized objective function, we adopt a perturbation procedure. We denote by $\hat{Q}_\delta$ and $\hat{Q}$ the minimizers of $F_\delta(Q)$ and F(Q) in H respectively. Furthermore, let $\hat{L}_\delta$ and $\hat{L}$ denote the subspaces recovered by the bottom d eigenvectors of $\hat{Q}_\delta$ and $\hat{Q}$ respectively. Using the constants $v_{D-d}$ and $\gamma_0$ of Theorem 6, the difference between the two minimizers and subspaces can be controlled as follows.

Theorem 8 If X is a data set satisfying (10), then $$\|\hat{Q}_\delta - \hat{Q}\|_F \leq \sqrt{\delta/2\gamma_0} \quad (28)$$

and $$\|P_{\hat{L}_\delta} - P_{\hat{L}}\|_F \leq \frac{2\sqrt{\delta/2\gamma_0}}{v_{D-d}}. \quad (29)$$

Interpretation of Our M-Estimator

Formal Similarity with the Common M-estimator for Robust Covariance Estimation

A robust M-estimator for the 0-centered covariance matrix minimizes the following function over all D×D positive definite matrices (for some choices of a function ρ)

$$L(A) = \sum_{i=1}^{N} \varrho(x_i^T A^{-1} x_i) - \frac{N}{2} \log(\det(A^{-1})). \quad (30)$$

The image of the estimated covariance is clearly an estimator to the underlying subspace L*.

If we set $\rho(x)=\sqrt{x}$ and $A^{-1}=Q^2$ then the objective function L(A) in (30) is $\Sigma_{i=1}^{N} \|Q_{x_i}\| - N \log|Q|$. This energy function is formally similar to our energy function. Indeed, using Lagrangian formulation, the minimizer ^Q in (4) is also the minimizer of $\Sigma_{i=1}^{N} \|Q_{x_i}\| - \lambda E \log|Q|$ among all D×D symmetric matrices (or equivalently nonnegative symmetric matrices) for some $\lambda > 0$ (the parameter $\lambda$ only scales the minimizer and does not effect the recovered subspace). Therefore, the two objective functions differ by their second terms. In the common M-estimator (with $\rho(x)=\sqrt{x}$ and $A^{-1}=Q^2$) it is log (det(Q)), or equivalently, (log(Q)), where in our M-estimator, it is (Q).

Problems with Exact Recovery for the Common M-estimator

The common M-estimator is designed for robust covariance estimation, however, we show here that in general it cannot exactly recover the underlying subspace. To make this statement more precise we recall the following uniqueness and existence conditions for the minimizer of (30): 1) $\mu=2\rho'$ is positive, continuous and non-increasing. 2) Condition M: u(x)x is strictly increasing. 3) Condition $D_0$: For any linear subspace L:

$$|\chi \cap L|/N < 1 - (D - dim(L))/\lim_{x \to \infty} xu(x).$$

The following Theorem 9 shows that the uniqueness and existence conditions of the common M-estimator are incompatible with exact recovery.

Theorem 9 Assume that d, D∈N, d<D, X is a data set in $\mathbb{R}^D$ and L*∈G(D, d) and let Â be the minimizer of (30). If conditions M and $D_0$ hold, then Im(Â)≠L*.

For symmetric outliers the common M-estimator can still asymptotically achieve exact recovery (similarly to PCA). However, for many scenarios of asymmetric outliers, in particular, the subspace recovered by the common M-estimator is sufficiently far from the underlying subspace for any given sample size.

Interpretation of ^Q as Robust Inverse Covariance Estimator

The total least squares subspace approximation is practically the minimization over L∈G(D,d) of the function $$\sum_{i=1}^{N} |x_i - P_L x_i|^2 \equiv \sum_{i=1}^{N} |P_L^\perp x_i|^2. \quad (31)$$

Its solution is obtained by the span of the top d right vectors of the data matrix X (whose rows are the data points in $\chi$), or equivalently, the top d eigenvectors of the covariance matrix $X^T X$. The convex relaxation used in (31) can be also applied to (31) to obtain the following convex minimization problem:

$$\hat{Q}_2 := _{Q \in H} \sum_{i=1}^{N} |Qx_i|^2. \quad (32)$$

The "relaxed" total least squares subspace is then obtained by the span of the bottom d eigenvectors of ^Q.

We show here that $\hat{Q}_2$ coincides with a scaled version of the empirical inverse covariance matrix. This clearly implies that the "relaxed" total least squared subspace coincides with the original one (as the bottom eigenvectors of the inverse empirical covariance are the top eigenvectors of the empirical covariance). We require though that the data is of full rank so that the empirical inverse covariance is well-defined. This requirement does not hold if the data points are contained within a lower-dimensional subspace, in particular, if their number is smaller than the dimension. We can easily avoid this restriction by initial projection of the data points onto the span of eigenvectors of the covariance matrix with nonzero eigenvalues. That is, by projecting the data onto the lowest-dimensional subspace containing it without losing any information.

Theorem 10 If X is the data matrix, $$\hat{Q}_2 = (X^T X)^{-1}/tr((X^T X)^{-1}) \quad (33)$$

We view (4) as a robust version of (32). Since we verified robustness of the subspace recovered by (4) and also showed that (32) yields the inverse covariance matrix, we sometimes refer to the solution of (4) as a robust inverse covariance matrix (though we have only verified robustness to subspace recovery). This idea helps us interpret our numerical procedure for minimizing (4), which we present below.

IRLS Algorithms for Minimizing (4)

Heuristic Proposal for Two IRLS Algorithms

The procedure for minimizing ( )formally follows from the simple fact that the directional derivative of F at ^Q in any direction ^Q−^Q, where Q∈H, is 0, i.e., $$\langle F(\hat{Q})|_{Q=\hat{Q}}, \tilde{Q} - \hat{Q} \rangle = 0 \text{ for any } \tilde{Q} \in H. \quad (34)$$

We remark that since $\mathbb{H}$ is an affine subspace of matrices, (34) holds globally in $\mathbb{H}$ and not just locally around ^Q.

We formally differentiate (4) at ^Q as follows (see more details in (45), which appears later):

$$F(Q)|_{Q=\hat{Q}} = \sum_{i=1}^{N} \frac{\hat{Q} x_i x_i^T + x_i x_i^T \hat{Q}}{2|\hat{Q} x_i|}. \quad (35)$$

Throughout the formal derivation we ignore the possibility of zero denominator in (35), that is, we assume that $\hat{Q}x_i \neq 0 \forall 1 \leq i \leq N$; we later address this issue.

Since F(^Q) is symmetric and Q−^Q can be any symmetric matrix with trace 0, it is easy to note that (34) implies that F(^Q) is a scalar matrix (e.g., multiply it by a basis of symmetric matrices with trace 0 whose members have exactly 2 nonzero matrix elements). That is, $$\sum_{i=1}^{N} \frac{\hat{Q} x_i x_i^T + x_i x_i^T \hat{Q}}{2\|\hat{Q} x_i\|} = cI \quad (36)$$

for some c∈$\mathbb{R}$. This implies that $$\hat{Q} = c \left( \sum_{i=1}^{N} \frac{x_i x_i^T}{|\hat{Q} x_i|} \right)^{-1}. \quad (37)$$

Indeed, we can easily verify that (37) solves (6), furthermore, (36) is a Lyapunov equation whose solution is unique. Since $\text{tr}(\hat{Q})=1$, we obtain that $$\hat{Q} = \left(\sum_{i=1}^{N} \frac{x_i x_i^T}{|\hat{Q} x_i|}\right)^{-1} \bigg/ \left(\left(\sum_{i=1}^{N} \frac{x_i x_i^T}{|\hat{Q} x_i|}\right)^{-1}\right),$$

which suggests the following iterative estimate of $\hat{Q}$:

$$Q_{k+1} = \left(\sum_{i=1}^{N} \frac{x_i x_i^T}{|Q_k x_i|}\right)^{-1} \bigg/ \left(\left(\sum_{i=1}^{N} \frac{x_i x_i^T}{|Q_k x_i|}\right)^{-1}\right). \quad (38)$$

Formula (38) is undefined whenever $Q_k x_i = 0$ for some $k \in \mathbb{N}$ and $1 \le i \le N$. In theory, we address it as follows. Let $I(Q) = \{1 \le i \le N : Q x_i = 0\}$, $L(Q) = \{x_i\}_{i \in I(Q)}$ and $$T(Q) = P_{L(Q)^\perp} \left(\sum_{i \notin I(Q)} \frac{x_i x_i^T}{|Q x_i|}\right)^{-1} P_{L(Q)^\perp} \bigg/ \left(P_{L(Q)^\perp} \left(\sum_{i \notin I(Q)} \frac{x_i x_i^T}{|Q x_i|}\right)^{-1} P_{L(Q)^\perp}\right). \quad (39)$$

Using this notation, the iterative formula can be corrected as follows $$Q_{k+1} = T(Q_k). \quad (40)$$

In practice, we can avoid data points satisfying $|Q_k x_i| \le \delta$ for a sufficiently small parameter $\delta$ (instead of $|Q_k x_i| = 0$). We follow a similar idea by replacing $F$ with the regularized function $F_\delta$ for a regularized parameter $\delta$. In this case, (40) obtains the following form:

$$Q_{k+1} = \left(\sum_{i=1}^{N} \frac{x_i x_i^T}{\max(|Q_k x_i|, \delta)}\right)^{-1} \bigg/ \left(\left(\sum_{i=1}^{N} \frac{x_i x_i^T}{\max(|Q_k x_i|, \delta)}\right)^{-1}\right). \quad (41)$$

We note that the RHS of (40) is obtained as the limit of the RHS of (41) when $\delta$ approaches 0.

The two iterative formulas, i.e., (40) and (41), give rise to IRLS algorithms. For simplicity of notation, we exemplify this idea with the formal expression in (38). It iteratively finds the solution to the following weighted (with weight $1/|Q_k x_i|$) least squares problem:

$$\operatorname*{argmin}_{Q \in H} \sum_{i=1}^{N} \frac{1}{\|Q_k x_i\|} \|Q x_i\|^2. \quad (42)$$

To show this, we note that (42) is a quadratic function and any formal directional derivative at $Q_{k+i}$ is 0. Indeed, $$\frac{d}{dQ} \sum_{i=1}^{N} \frac{1}{|Q_k x_i|} |Q x_i|^2 \bigg|_{Q=Q_{k+1}} =$$

-continued $$Q_{k+1} \left(\sum_{i=1}^{N} \frac{x_i x_i^T}{|Q_k x_i|}\right) + \left(\sum_{i=1}^{N} \frac{x_i x_i^T}{|Q_k x_i|}\right) Q_{k+1} = cI$$

for some $c \in \mathbb{R}$, and $\langle I, Q - Q_{k+1} \rangle_F = 0$ for any $Q \in H$. Consequently, $Q_{k+1}$ of (38) is the minimizer of (42).

Formula (41) (as well as (40)) provides another interpretation for $\hat{Q}$ as robust inverse covariance. Indeed, we note for example that the RHS of (41) is the scaled inverse of a weighted covariance matrix; the scaling enforces the trace of the inverse to be 1 and the weights of $x_i x_i^T$ are significantly larger when $x_i$ is an inlier. In other words, the weights apply a shrinkage procedure for outliers. Indeed, since $Q_k x_i$ approaches $\hat{Q} x_i$ and the underlying subspace, which contain the inliers, is recovered by $\ker(\hat{Q})$, for an inlier $x_i$ the coefficient of $x_i x_i^T$ approaches $1/\delta$, which is a very large number (in practice we use $\delta = 10^{-20}$). On the other hand, when $x_i$ is sufficiently far from the underlying subspace, the coefficient of $x_i x_i^T$ is significantly smaller.

As another example implementation, estimator 22 may re-computes the minimization matrix ($A_{k+1}$) as a normalized and weighted covariance (i.e., not an inverse covariance) having weighting coefficients that represent proximity to estimate of the subspace associated with minimization matrix ($A_k$). In this case, the minimization matrix A may be represented as follows:

$$A_{n+1} = \sum_{i=1}^{N} \frac{x_i x_i^T}{\|A_n^{-1} x_i\|}, \quad A_{n+1} = A_{n+1} \cdot tr(A_{n+1}^{-1})$$

where $\chi = \{x_1, x_2, \ldots, x_N\}$ represents the set of data points, and $\|A_n^{-1} x_i\|$ operates as the coefficient representative, for each of the data points, the proximity of the data point to the current estimate of the subspace Theory: Convergence Analysis of the IRLS Algorithms The following theorem analyzes the convergence of the sequence proposed by (40) to the minimizer of (4).

Theorem 11 Let $X = \{x_i\}_{i=1}^N$ be a data set in $\mathbb{R}^D$ satisfying (10), $\hat{Q}$ the minimizer of (4), $Q_0$ an arbitrary symmetric matrix with $\text{tr}(Q_0) = 1$ and $\{Q_i\}_{i \in N}$ the sequence obtained by iteratively applying (40) (while initializing it with $Q_{01}$), then $\{Q_i\}_{i \in N}$ converges to a matrix $\tilde{Q} \in \mathbb{H}$. If $\tilde{Q}_{x_i} \ne 0$ for all $1 \le i \le N$, then the sequence $\{Q_i\}_{i \in N}$ converges linearly to $\tilde{Q}$ and $\tilde{Q} = \hat{Q}$.

The condition for the linear convergence to $\hat{Q}$ in Theorem 11 (i.e., $\hat{Q} x_i \ne 0$ for all $1 \le i \le N$) usually does not occur for noiseless data. This phenomenon is common in IRLS algorithms whose objective functions are $l_1$-type and are not twice differentiable at 0. Regularized IRLS algorithms often converge linearly to the minimizer of the regularized function. We demonstrate this principle in our case as follows.

Theorem 12 Let $X = \{x_i\}_{i=1}^N$ be a data set in $\mathbb{R}^D$ satisfying (10), $Q_0$ an arbitrary symmetric matrix with $\text{tr}(Q_0) = 1$ and $\{Q_i\}_{i \in N}$ the sequence obtained by iteratively applying (41) (while initializing it with $Q_0$). Then the sequence $\{Q_i\}_{i \in N}$ converges linearly to the unique minimizer of $F_\delta(Q)$.

The linear convergence rate of the iterative application of (41) depends on $\delta$. This rate is at most:

$$r(\delta) = \sqrt{\max_{\Delta=\Delta^T, tr(\Delta)=0} \frac{\sum_{i=1, \|Q*x_i\|>\delta}^{N} \frac{(x_i^T \Delta Q * x_i)^2}{\|Q*x_i\|^3}}{\sum_{i=1}^{N} \frac{\|\Delta x_i\|^2}{\max(\|Q*x_i, \delta\|)}}}.$$

That is, $|Q_k - \hat{Q}| < C \cdot r(\delta)^k$ for some constant $C > 0$. If (10) holds, then $r(\delta) < 1$ for all $\delta > 0$ and $r(\delta)$ is a non-increasing function. Furthermore, if $\{x_i \in \chi : |\hat{Q} x_i| \neq 0\}$ satisfies assumption (10), then $$\lim_{\delta \to 0} r(\delta) < 1.$$

The Practical Choices for the IRLS Algorithm

Following the theoretical discussion, we prefer using the regularized version of the IRLS algorithm. We fix the regularization parameter to be smaller than the rounding error, i.e., $\delta = 10^{-20}$, so that the regularization is very close to the original problem (even without regularization the iterative process is stable, but may have few warnings on badly scaled or close to singular matrices). The idea of the algorithm is to iteratively apply (41) with an arbitrary initialization (symmetric with trace 1). We note that in theory $\{F_\delta(Q_k)\}_{k \in \mathcal{N}}$ is non-increasing. However, empirically the sequence decreases when it is within the rounding error to the minimizer. Therefore, we check $F_\delta(Q_k)$ every four iterations and stop our algorithm when we detect an increase (we noticed empirically that checking every four iterations, instead of every iteration, improves the accuracy of the algorithm). Algorithm 2 summarizes our practical procedure for minimizing (4).

$$Q_{k+1} = \left( \sum_{i=1}^{N} \frac{x_i x_i^T}{\max(\|Q_k x_i\|, \delta)} \right)^{-1} / tr\left( \left( \sum_{i=1}^{N} \frac{x_i x_i^T}{\max(\|Q_k x_i\|, \delta)} \right)^{-1} \right).$$

Complexity of Algorithm 2

Each update of Algorithm 2 requires a complexity of order $O(N \cdot D^2)$, due to the sum of N D×D matrices. Therefore, for $n_s$ iterations the total running time of Algorithm 2 is of order $O(n_S \cdot N \cdot D^2)$. In most of our numerical experiments $n_s$ was less than 40. The storage of this algorithm is $O(N \times D)$, which amounts to storing $\chi$. Thus, Algorithm 2 has the same order of storage and complexity as PCA. In practice, it might be a bit slower due to a larger constant for the actual complexity.

Subspace Recovery in Practice

We view the GMS algorithm as a prototype for various subspace recovery algorithms. We discuss here modifications and extensions of this procedure in order to make it even more practical.

Subspace Recovery without Knowledge of d

In theory, the subspace recovery described here can work without knowing the dimension d. In the noiseless case, one may use (5) to estimate the subspace as guaranteed by Theorem 1. In the case of small noise one can estimate d from the eigenvalues of $\hat{Q}$ and then apply the GMS algorithm. This strategy is theoretically justified by Theorems 1 and 6 as well as the discussion following (87). The problem is that condition (9) for guaranteeing exact recovery by GMS is restrictive; in particular, it requires the number of outliers to be larger than at least D−d (according to our numerical experiments it is safe to use the lower bound 1.5 (D−d)). For practitioners, this is a failure mode of GMS, especially when the dimension of the data set is large (for example, D>N).

While this seems to be a strong restriction, we remark that the problem of exact subspace recovery without knowledge of the intrinsic dimension is rather hard and some assumptions on data sets or some knowledge of data parameters would be expected. Other algorithms for this problem require estimates of unknown regularization parameters (which often depend on various properties of the data, in particular, the unknown intrinsic dimension) or strong assumptions on the underlying distribution of the outliers or corrupted elements.

We first note that if only conditions (6) and (7) hold, then Theorem 1 still guarantees that the GMS algorithm outputs a subspace containing the underlying subspace. Using some information on the data one may recover the underlying subspace from the outputted subspace containing it, even when dealing with the failure mode.

In the rest of this section we describe several practical solutions for dealing with the failure mode, in particular, with small number of outliers. We later demonstrate them numerically for artificial data and for real data.

Our first practical solution is to reduce the ambient dimension of the data. When the reduction is not too aggressive, it can be performed via PCA. We also propose a robust dimensionality reduction which can be used instead. There are two problems with this strategy. First of all, the reduced dimension is another parameter that requires tuning. Second of all, some information may be lost by the dimensionality reduction and thus exact recovery of the underlying subspace is generally impossible.

A second practical solution is to add artificial outliers. The number of added outliers should not be too large (otherwise (6) and (7) will be violated), but they should sufficiently permeate through $\mathbb{R}^D$ so that (9) holds. In practice, the number of outliers can be 2D, since empirically (9) holds with high probability when $N_0 = 2(D-d)$. To overcome the possible impact of outliers with arbitrarily large magnitude, we project the data with artificial outliers onto the sphere. Furthermore, if the original data matrix does not have full rank (in particular if N<D) we reduce the dimension of the data (by PCA) to be the rank of the data matrix. This dimensionality reduction clearly does not result in any loss of information. We refer to the whole process of initial "lossless dimensionality reduction" (if necessary), addition of 2D artificial Gaussian outliers, normalization onto the sphere and application of GMS (with optional estimation of d by the eigenvalues of $\hat{Q}$) as the GMS2 algorithm. We believe that it is the best practical solution to avoid condition (9) when d is unknown.

A third solution is to regularize our M estimator, that is, to minimize the following objective function with the regularization parameter $\lambda$:

$$\hat{Q} = {}_{(Q)=1, Q=Q^T} \sum_{i=1}^{N} |Qx_i| + \lambda |Q|_F^2. \tag{43}$$

The IRLS algorithm then becomes $$Q_{k+1} = \left( \sum_{i=1}^{N} \frac{x_i x_i^T}{\max(\|Q_k x_i\|, \delta)} + 2\lambda I \right)^{-1} / \left( \left( \sum_{i=1}^{N} \frac{x_i x_i^T}{\max(\|Q_k x_i\|, \delta)} \right)^{-1} + 2\lambda I \right).$$

We note that if $\lambda = 0$ and there are only few outliers, then in the noiseless case dim(ker($\hat{Q}$))>d and in the small noise case the number of significantly small eigenvalues is bigger than d. On the other hand when $\lambda \to \infty$, $\hat{Q} \to I/D$, whose kernel is degenerate (similarly, it has no significantly small eigenvalues). Therefore, there exists an appropriate $\lambda$ for which dim(ker($\hat{Q}$)) (or the number of significantly small eigenvalues of $\hat{Q}$) is d. This formulation transforms the estimation of d into estimation of $\lambda$.

Subspace Recovery with Knowledge of d

Knowledge of the intrinsic dimension d can help improve the performance of GMS or suggest completely new variants (especially as GMS always finds a subspace containing the underlying subspace). For example, knowledge of d can be used to carefully estimate the parameter $\lambda$ of (43), e.g., by finding $\lambda$ yielding exactly a d-dimensional subspace via a bisection procedure.

The EGMS Algorithm

We formulate in Algorithm 3 the Extended Geometric Median Subspace (EGMS) algorithm for subspace recovery with known intrinsic dimension.

Algorithm 3 The Extended Geometric Median Subspace Algorithm

Input: $X = \{x_i\}_{i}^{N} \subset \mathbb{R}^R$: data, d:dimension of L*, an algorithm for minimizing (4)
Output: $\hat{L}$: a d-dimnsional linear subspace in $\mathbb{R}^D$.
  Steps:
  $\hat{L} = \mathbb{R}^D$
  repeat
    $\hat{Q} = \arg\min_{Q \in H, QP_{\hat{L}^\perp} = \rho} F(Q)$
    u = the top eigenvector of $\hat{Q}$
    $\hat{L} = \hat{L} \cap S_R(u^\perp)$
  until dim($\hat{L}$) = d We justify this basic procedure in the noiseless case without requiring (9) as follows. Theorem 13 Assume that d, $D \in \mathbb{N}$, d<D, X is a data set in $\mathbb{R}^D$ and L*$\in$G (D, d). If only conditions (6) and (7) hold, then the EGMS Algorithm exactly recovers L*.

The vectors obtained by EGMS at each iteration can be used to form robust principal components (in reverse order), even when $\hat{Q}$ is degenerate.

Computational Complexity of GMS and EGMS

The computational complexity of GMS is of the same order as that of Algorithm 2, i.e., $O(n_s \cdot N \cdot D^2)$ (where $n_s$ is the number of required iterations for Algorithm 2). Indeed, after obtaining $\hat{Q}$, computing L* by its smallest d eigenvectors takes an order of $O(d \cdot D^2)$ operations.

EGMS on the other hand repeats Algorithm 2 D-d times; therefore it adds an order of $O((D-d) \cdot n_s \cdot N \cdot D^2)$ operations, where $n_s$ denotes the total number of iterations for Algorithm 2. In implementation, we can speed up the EGMS algorithm by excluding the span of some of the top eigenvectors of $\hat{Q}$ from $\hat{L}$ (instead of excluding only the top eigenvector in the third step of Algorithm 2). We demonstrate this modified procedure on artificial setting below.

Numerical Experiments

Model for Synthetic Data

Below, we generate data from the following model. We randomly choose L*$\in$G(D, d), sample $N_1$ inliers from the d-dimensional Multivariate Normal distribution $N(0, I_{d \times d})$ on L* and add $N_0$ outliers sampled from a uniform distribution on $[0,1]^D$. The outliers are strongly asymmetric around the subspace to make the subspace recovery problem more difficult. In some experiments below, additional Gaussian noise is considered. When referring to this synthetic data we only need to specify its parameters $N_1$, $N_0$, D, d and possibly the standard deviation for the additive noise. For any subspace recovery algorithm (or heuristics), we denote by $\hat{L}$ its output (i.e., the estimator for L*) and measure the corresponding recovery error by $e_L = |P_{\hat{L}} - P_{L^*}|_F$.

Demonstration of Practical Solutions

We present two different artificial cases, where in one of them condition (9) holds and in the other one it does not hold and test the practical solutions in the second case.

The two cases are the following instances of the synthetic model: (a) $(N_1, N_0, D, d) = (100, 100, 100, 20)$ and (b) $(N_1, N_0, D, d) = (100, 20, 100, 20)$. The GMS algorithm estimates the underlying subspace L* given d=20 with recovery errors $2.1 \times 10^{-10}$ and 3.4 in cases (a) and (b) respectively. In case (a) there are sufficiently many outliers (with respect to D-d) and the GMS algorithm is successful. We later show that the underlying dimension (d=20) can be easily estimated by the eigenvalues of $\hat{Q}$. In case (b) $N_0 = 0.25 \cdot (D-d)$, therefore, condition (9) is violated and the GMS algorithm completely fails.

We demonstrate the success of the practical solutions in case (b). We assume that the dimension d is known, though we also estimate d correctly for the non-regularized solutions. Therefore, these solutions can be also applied without knowing the dimension. If we reduce the dimension of the data set in case (b) from D=100 to D=35 (via PCA; though one can also use EGMS), then GMS (with d=20) achieves a recovery error of 0.23, which indicates that GMS almost recovers the subspace correctly. We remark though that if we reduce the dimension to e.g., D=55, then the GMS algorithm will still fail. We also note that the recovery error is not as attractive as the ones below; this observation probably indicates that some information was lost during the dimension reduction.

The GMS2 algorithm with d=20 recovers the underlying subspace in case (b) with error $1.2 \times 10^{-10}$. This is the method we advocated for when possibly not knowing the intrinsic dimension.

The regularized minimization of (43) with $\lambda = 100$ works well for case (b). In fact, it recovers the subspace as ker$\hat{Q}$ (without using its underlying dimension) with error $3.3 \times 10^{-13}$. The only issue is how to determine the value of $\lambda$. We described above that if d is known, then $\lambda$ can be carefully estimated by the bisection method. This is true for this example, in fact, we initially chose $\lambda$ this way.

We remark that the REAPER algorithm did not perform well for this particular data, though in general it is a very successful solution. The recovery error of the direct REAPER algorithm was 3.725 (and 3.394 for S-REAPER) and the error for its modified version via bisection (relaxing the bound on the largest eigenvalue so that dim(ker($\hat{Q}$))=20) was 3.734 (and 3.175 for S-REAPER).

At last we demonstrate the performance of EGMS and its faster heuristic with d=20. The recovery error of the original EGMS for case (b) is only 0.095. We suggested above a faster heuristic for EGMS, which can be reformulated as follows: In the third step of Algorithm 3, we replace u (the top eigenvector of $\hat{Q}$) with U, the subspace spanned by several top eigenvectors. In the noiseless case, we could let U be the span of the nonzero eigenvectors of $\hat{Q}$. This modification of EGMS (for the noiseless case) required only two repetitions of Algorithm 2 and its recovery error was $2.2 \times 10^{-13}$. In real data sets with noise we need to determine the number of top eigenvectors spanning U, which makes this modification of EGMS less automatic.

Demonstration of Dimension Estimation

Figure 3A:
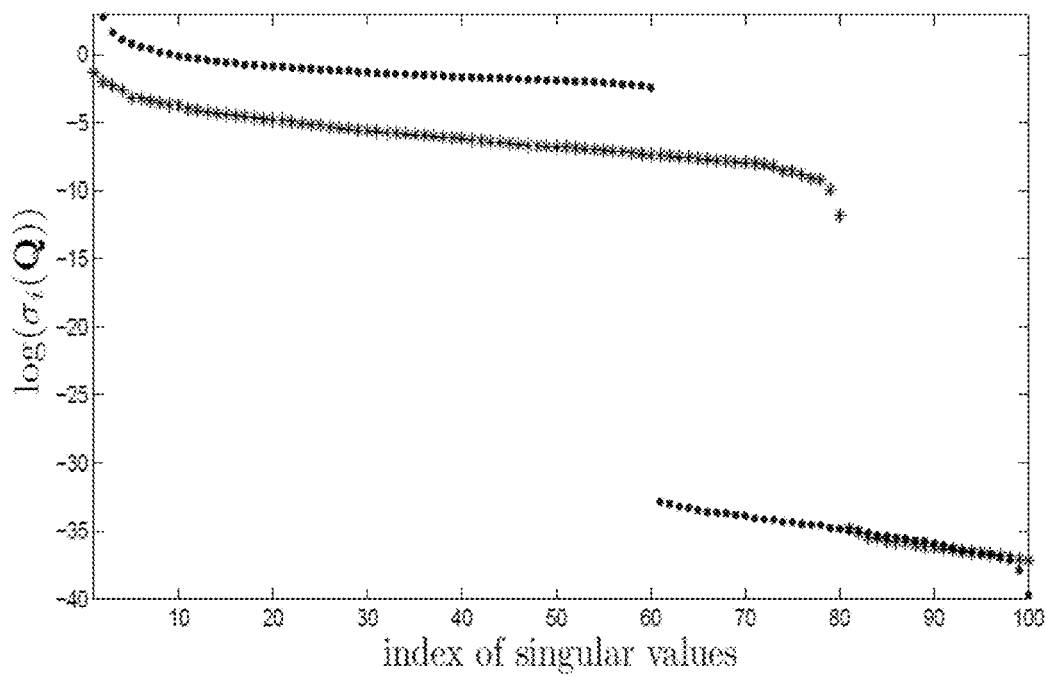
FIGS. 3A-3B are graphs showing the eigenvalues of $\hat{Q}$ obtained by Algorithm 2.
Figure 3B:
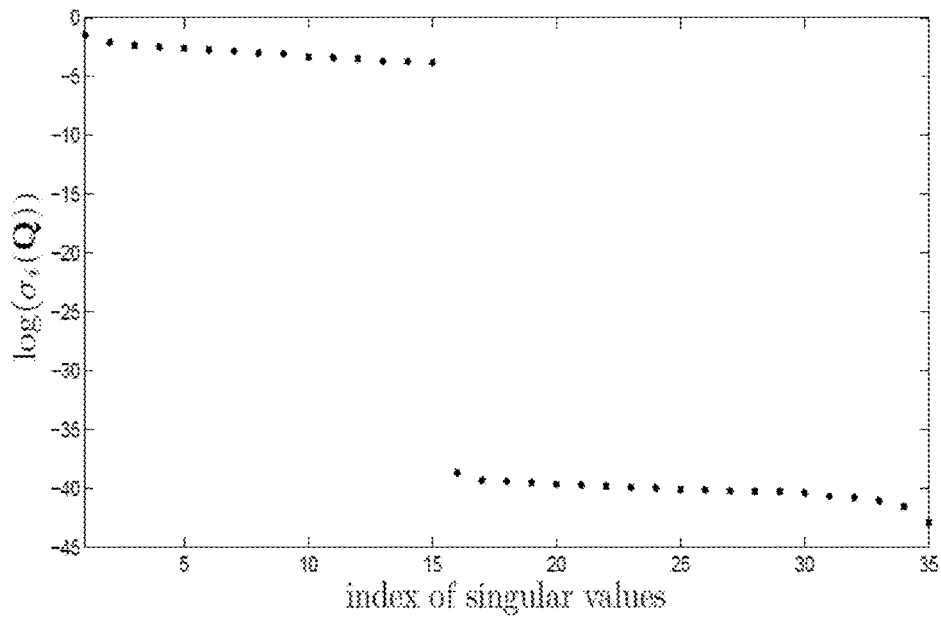

We test dimension estimation by eigenvalues of $\hat{Q}$ for cases (a) and (b). The eigenvalues of $\hat{Q}$ obtained by Algorithm 2 for the two cases are shown in FIGS. 3A-3B. That is, in FIG. 3A, the starred points and the dotted point represent log-scaled eigenvalues of the output of Algorithm 2 for cases (a) and (b) respectively FIG. 3B corresponds to case (b) with dimension reduced to 35.

In FIG. 3A, the largest logarithmic eigengap (i.e., the largest gap in logarithms of eigenvalues) occurs at 80, so we can correctly estimate that d=D−80=20 (the eigenvalues are not zero since Algorithm 2 uses the δ-regularized objective function). However, in FIG. 3B, the largest eigengap occurs at 60 and thus mistakenly predicts d=40.

As we discussed above, the dimension estimation fails here since condition (9) is not satisfied. However, we have verified that if we try any of the solutions proposed above then we can correctly recover that d=20 by the logarithmic eigengap. For example, in FIG. 3B, we demonstrate the logarithms of eigenvalues of $\hat{Q}$ in case (b) after dimensionality reduction (via PCA) onto dimension D=35 and it is clear that the largest gap is at d=20 (or D−d=80). We obtained similar graphs when using 2D artificial outliers (more precisely, the GMS2 algorithm without the final application of the GMS algorithm) or the regularization of (43) with λ=100.

Information Obtained from Eigenvectors

Throughout the paper we emphasized the subspace recovery problem, but did not discuss at all the information that can be inferred from the eigenvectors of our robust PCA strategy. Since in standard PCA these vectors have significant importance, we exemplify the information obtained from our robust PCA and compare it to that obtained from PCA and some other robust PCA algorithms.

We create a sample from a mixture of two Gaussian distributions with the same mean and same eigenvalues of the covariance matrices but different eigenvectors of the covariance matrices. The mixture percentages are 25% and 75%. We expect the eigenvectors of any good robust PCA algorithm (robust to outliers as perceived in this paper) to be close to that of the covariance of the mail component (with 75%).

More precisely, we sample 300 points from $N(0, \Sigma_1)$, where $\Sigma_1$ is a 10×10 diagonal matrix with elements 1, $2^{-1}$, $2^{-2}$, ..., $2^{-9}$ and 100 points from $N(0, \Sigma_2)$, where $\Sigma_2 = U\Sigma_1 U^T$, where U is randomly chosen from the set of all orthogonal matrices in $\mathbb{R}^{10 \times 10}$. The goal is to estimate the eigenvectors of $\Sigma_1$ (i.e., the standard basis vectors $\mathbb{R}^{10}$) in the presence of 25% "outlier". Unlike the subspace recovery problem, where we can expect to exactly recover a linear structure among many outliers, here the covariance structure is more complex and we cannot exactly recover it with 25% outliers.

We estimated the eigenvectors of $\Sigma_1$ by the eigenvectors of $\hat{Q}$ of Algorithm 2 in reverse order (recall that $\hat{Q}$ is a scaled and robust version of the inverse covariance). We refer to this procedure as "EVs (eigenvectors) of $\hat{Q}^{-1}$". We also estimated these eigenvectors by standard PCA, LLD with $\lambda=0.8\sqrt{D/N}$ and PCP with $\lambda=1/\sqrt{\max(D,N)}$. We repeated the random simulation (with different samples for the random orthogonal matrix U) 100 times reported in Table 2 the average angles between the estimated and actual top two eigenvectors of $\Sigma_1$ according to the different methods. We note that the "EVs of $\hat{Q}^{-1}$" outperforms PCS, LLD (or OP) and PCP in terms of estimation of the top two eigenvectors of $\Sigma_1$. We remark though that PCP does not suit for robust estimation of the empirical covariance and thus the comparison is unfair for PCP.

TABLE 2

Angles (in degrees) between the estimated and actual top two eigenvectors of $\Sigma_1$

| | EVs of $\hat{Q}^{-1}$ | LLD | PCP | PCA |
|---|---|---|---|---|
| Eigenvector 1 | 3.0° | 5.5° | 45.7° | 14.8° |
| Eigenvector 2 | 3.0° | 5.5° | 47.4° | 40.3° |

When the covariance matrix $\Sigma_1$ (and consequently also $\Sigma_2$) is degenerate, $\hat{Q}$ might be singular and therefore $\hat{Q}$ cannot be directly used to robustly estimate eigenvectors of the covariance matrix. For this case, EGMS (Algorithm 3 can be used where the vector u obtained in the ith iteration of Algorithm 3 can be considered as the (D−i+1)st robust eigenvector (that is, we reverse the order again). To test the performance of this method, we modify $\Sigma_1$ in the above model as follows: $\Sigma_1$=diag (1, 0.5, 0.25, 0, 0, ..., 0). We repeated the random simulations of this modified model 100 times and reported in Table 2 the average angles between the estimated and actual top two eigenvectors of $\Sigma_1$ according to the different methods. Here LLD did slightly better than EGMS and they both outperformed PCA (and PCP).

TABLE 3

Angles (in degrees) between the estimated and actual top two eigenvectors of $\Sigma_1$

| | EGMS | LLD | PCP | PCA |
|---|---|---|---|---|
| Eigenvector 1 | 5.2° | 3.4° | 42.6° | 8.2° |
| Eigenvector 2 | 5.2° | 3.4° | 47.3° | 16.1° |

The Effect of the Regularization Parameter δ

Figure 4:
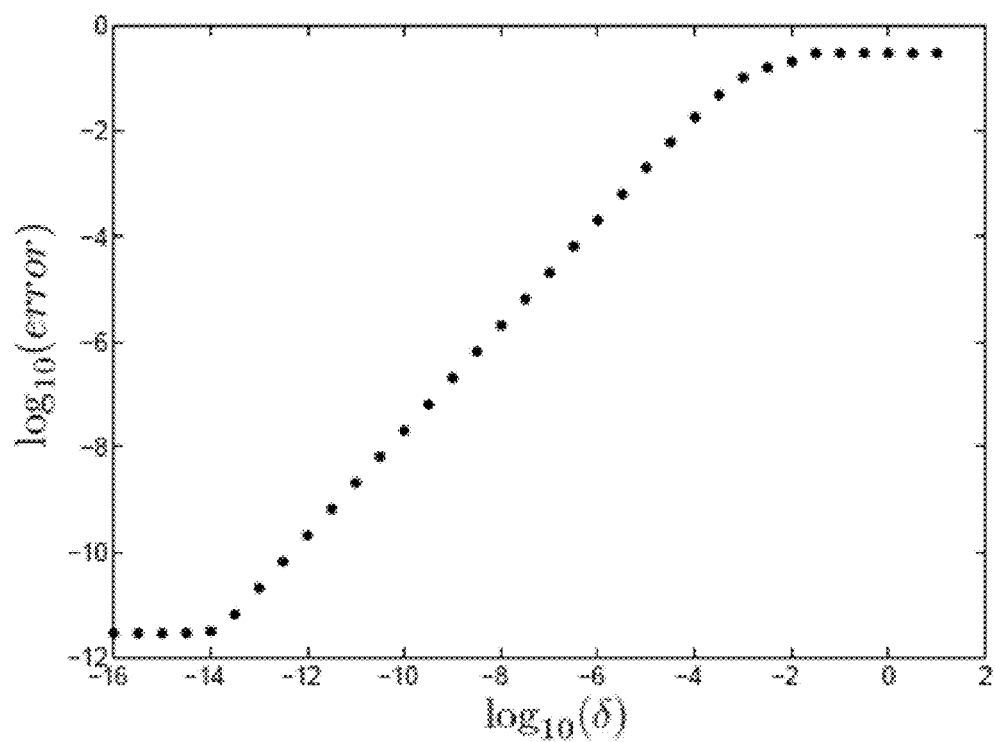
FIG. 4 is a graph of the recovery errors and the regularization parameters $\delta$.

We assume a synthetic data set sampled according to the model above with $(N_1, N_0, D, d)=(250, 250, 100, 10)$. We use the GMS algorithm with d=10 and different values of the regularization parameter δ and record the recovery error in FIG. 4. FIG. 4 is a graph of the recovery errors and the regularization parameters δ. For $10^{-14} \leq \delta \leq 10^{-2}$, log(error)−log(δ) is constant. We thus empirically obtain that the error is of order O(δ) in this range. On the other hand, (29) only obtained an order of $O(\sqrt{\delta})$. It is possible that methods similar to those of Coudron and Lerman (2012) can obtain sharper error bounds. We also expect that for δ sufficiently small (here smaller than $10^{-14}$), the rounding error becomes dominant. On the other hand, perturbation results are often not valid for sufficiently large δ (here this is the case for $\delta > 10^{-2}$).

Detailed Comparison with Other Algorithms for Synthetic Data

Using the synthetic data, we compared the GMS algorithm with the following algorithms: MDR (Mean Absolute Deviation Roundin), LLD (Low-Leverage Decomposition), OP (Outlier Pursuit), PCP (Principal Component Pursuit), MKF (Median K-flats with K=1), HR-PCA (High-dimensional Robust PCA), a common M-estimator and $R_1$-PCA. We also record the output of standard PCA, where we recover the subspace by the span of the top d-eigenvectors. We ran the experiments on a computer with Intel Core 2 CPU at 2.66 GHz and 2 GB memory.

We remark that since the basic GMS algorithm already performed very well on these artificial instances.

For all of our experiments with synthetic data, we could correctly estimate d by the largest logarithmic eigengap of the output of Algorithm 2. Nevertheless, we used the knowledge of d for all algorithms for the sake of fair comparison.

For LLD. OP and PCP we estimated L* by the span of the top d eigenvectors of the low-rank matrix. Similarly, for the common M-estimator we used the span of the top d eigenvectors of the estimated covariance A. For the HR-PCA algorithm we also used the true percentage of outliers (50% in our experiments). For LLD, OP and PCP we set the mixture parameter λ as $0.8\sqrt{D/N}, 0.8\sqrt{D/n}, 1/\sqrt{\max(D,N)}$ respectively (following the suggestions of McCoy and Tropp (2011) for LLD/OP and Candes et al., (2011) for PCP). These choices of parameters are also used in experiments with real data sets.

For the common M-estimator, we used $u(x)=2 \max(\ln(x)/x, 10^{30})$ and the algorithm discussed by Kent and Tyler (1991). Considering the conditions discussed above, we also tried other functions: $u(x)=\max(x^{-0.5}, 10^{30})$ had a significantly larger recovery error and $u(x)=\max(x^{-0.9}, 10^{30})$ resulted in a similar recovery error as $\max(\ln(x)/x, 10^{30})$ but a double running time.

We used the syntectic data with different values of $(N_1, N_0, D, d)$. In some instances we also add noise from the Gaussian distribution $N(0, \eta^2 I)$ with $\eta=0.1$ or $0.01$. We repeated each experiment 20 times (due to the random generation of data). We record in Table 4 the mean running time, the mean recovery error and their standard deviations.

We remark that PCP is designed for uniformly corrupted coordinates of data, instead of corrupted data points (i.e., outliers), therefore, the comparison with PCP is somewhat unfair for this kind of data. On the other hand, the applications are tailored for the PCP model (though the other algorithms still apply successfully to them).

From Table 4 we can see that GMS is the fastest robust algorithm. Indeed, its running time is comparable to that of PCA. We note that this is due to its linear convergence rate (usually it converges in less than 40 iterations). The common M-estimator is the closest algorithm in terms of running time to GMS, since it also has the linear convergence rate. In contrast, PCP, OP and LLD need a longer running time since their convergence rates are much slower. Overall, GMS performs best in terms of exact recovery. The PCP, OP and LLD algorithms cannot approach exact recovery even by tuning the parameter $\lambda$. For example, in the case where , $(N_1, N_0, D, d)=(125, 125, 10, 5)$ with $\eta=0$, we checked a geometric sequence of 101 $\lambda$ values from 0.01 to 1, and the smallest recovery errors for LLD, OP and PCP are 0.17, 0.16 and 0.22 respectively. The common M-estimator performed very well for many cases (sometimes slightly better than GMS), but its performance deteriorates as the density of outliers increases (e.g., poor performance for the case where $(N_1, N_0, D, d)=(125, 125, 10, 5)$. Indeed, Theorem 9 indicates problems with the exact recovery of the common M-estimator.

At last, we note that the empirical recovery error of the GMS algorithm for noisy data sets is in the order of $\sqrt{\eta}$, where $\eta$ is the size of noise.

Face Data

We apply our algorithm to face images. It has been shown that face images from the same person lie in a low-dimensional linear subspace of dimension at most 9. However, cast shadows, specular reflections and saturations could possibly distort this low-rank modeling. Therefore, one can use a good robust PCA algorithm to remove these errors if one has many images from the same face.

We used the images of the first two persons in the extended Yale face database B, where each of them has 65 images of size 192×168 under different illumination conditions. Therefore we represent each person by 65 vectors of length 32256. We applied GMS, GMS2 and EGMS with d=9 and we also reduced the 65×32256 matrix to 65×65 (in fact, we only reduced the representation of the column space) by rejecting left vectors with zero singular values. We also applied the GMS algorithm after initial dimensionality reduction (via PCA) to D=20. The running times of EGMS and GMS (without dimensionality reduction) are 13 and 0.16 seconds respectively on average for each face (we used the same computer as above). On the other hand, the running times of PCP and LLD are 193 and 2.7 seconds respectively. Moreover, OP ran out of memory.

Figure 5:
FIG. 5 shows the Recovering faces: (a) given images, (b)-(f) the recovered images by EGMS, GMS without dimension reduction, GMS2, GMS with dimension reduced to 20, PCP and LLD respectively.

FIG. 5 shows the Recovering faces: (a) given images, (b)-(f) the recovered images by EGMS, GMS without dimension reduction, GMS2, GMS with dimension reduced to 20, PCP and LLD respectively. The recovered images are shown in FIG. 5, where the shadow of the nose and the parallel lines were removed best by EGMS. The GMS algorithm without dimension reduction did not perform well, due to the difficulty explained in above. The GMS2 algorithm turns out to work well, except for the second image of face 2. However, other algorithms such as PCP and GMS with dimension reduction (D=20) performed even worse on this image and LLD did not remove any shadow at all; the only good algorithm for this image is EGMS.

TABLE 4

Mean running times, recovery errors and their standard deviations for synthetic data.

| $(N_1, N_0, D, d)$ | | GMS | MDR | LLD | OP | PCP | HR-PCA | MKF | PCA | M-est. | $R_1$-PCA |
|---|---|---|---|---|---|---|---|---|---|---|---|
| (125, 125, 10, 5) | e | 6e-11 | 0.275 | 1.277 | 0.880 | 0.605 | 0.210 | 0.054 | 0.193 | 0.102 | 0.121 |
| $\eta = 0$ | std.e | 4e-11 | 0.052 | 0.344 | 0.561 | 0.106 | 0.049 | 0.030 | 0.050 | 0.037 | 0.048 |
| | t(s) | 0.008 | 0.371 | 0.052 | 0.300 | 0.056 | 0.378 | 0.514 | 0.001 | 0.035 | 0.020 |
| | std.t | 0.002 | 0.120 | 0.005 | 0.054 | 0.002 | 0.001 | 0.262 | 8e-06 | 4e-04 | 0.014 |
| (125, 125, 10, 5) | e | 0.011 | 0.292 | 1.260 | 1.061 | 0.567 | 0.233 | 0.069 | 0.213 | 0.115 | 0.139 |
| $\eta = 0.01$ | std.e | 0.004 | 0.063 | 0.316 | 0.491 | 0.127 | 0.075 | 0.036 | 0.073 | 0.054 | 0.073 |
| | t(s) | 0.008 | 0.340 | 0.053 | 0.287 | 0.056 | 0.380 | 0.722 | 0.001 | 0.035 | 0.052 |
| | std.t | 0.001 | 0.075 | 0.007 | 0.033 | 0.001 | 0.009 | 0.364 | 1e-05 | 4e-04 | 0.069 |
| (125, 125, 10, 5) | e | 0.076 | 0.264 | 1.352 | 0.719 | 0.549 | 0.200 | 0.099 | 0.185 | 0.122 | 0.128 |
| $\eta = 0.1$ | std.e | 0.023 | 0.035 | 0.161 | 0.522 | 0.102 | 0.051 | 0.033 | 0.048 | 0.041 | 0.050 |
| | t(s) | 0.007 | 0.332 | 0.055 | 0.301 | 0.056 | 0.378 | 0.614 | 0.001 | 0.035 | 0.032 |
| | std.t | 0.001 | 0.083 | 0.004 | 0.044 | 0.001 | 0.001 | 0.349 | 7e-06 | 4e-04 | 0.037 |
| (125, 125, 50, 5) | e | 2e-11 | 0.652 | 0.258 | 0.256 | 0.261 | 0.350 | 0.175 | 0.350 | 1e-12 | 0.307 |
| $\eta = 0$ | std.e | 3e-11 | 0.042 | 0.030 | 0.032 | 0.033 | 0.023 | 0.028 | 0.025 | 5e-12 | 0.029 |
| | t(s) | 0.015 | 0.420 | 0.780 | 1.180 | 3.164 | 0.503 | 0.719 | 0.006 | 0.204 | 0.020 |
| | std.t | 0.001 | 0.128 | 0.978 | 0.047 | 0.008 | 0.055 | 0.356 | 9e-05 | 0.001 | 0.011 |
| (125, 125, 50, 5) | e | 0.061 | 0.655 | 0.274 | 0.271 | 0.273 | 0.355 | 0.196 | 0.359 | 0.007 | 0.321 |
| $\eta = 0.01$ | std.e | 0.009 | 0.027 | 0.039 | 0.038 | 0.040 | 0.038 | 0.038 | 0.033 | 0.001 | 0.038 |
| | t(s) | 0.023 | 0.401 | 4.155 | 1.506 | 0.499 | 0.653 | 0.656 | 0.006 | 0.191 | 0.028 |
| | std.t | 0.002 | 0.079 | 0.065 | 0.197 | 0.006 | 0.044 | 0.377 | 8e-05 | 0.001 | 0.022 |
| (125, 125, 50, 5) | e | 0.252 | 0.658 | 0.292 | 0.290 | 0.296 | 0.358 | 0.264 | 0.363 | 0.106 | 0.326 |
| $\eta = 0.1$ | std.e | 0.027 | 0.033 | 0.032 | 0.032 | 0.033 | 0.027 | 0.031 | 0.032 | 0.014 | 0.032 |
| | t(s) | 0.021 | 0.363 | 0.923 | 1.726 | 0.501 | 0.638 | 0.641 | 0.006 | 0.191 | 0.025 |
| | std.t | 0.001 | 0.063 | 0.033 | 0.470 | 0.009 | 0.051 | 0.240 | 1e-04 | 0.001 | 0.012 |

TABLE 4-continued

Mean running times, recovery errors and their standard deviations for synthetic data.

| ($N_1$, $N_0$, D, d) | | GMS | MDR | LLD | OP | PCP | HR-PCA | MKF | PCA | M-est. | $R_1$-PCA |
|---|---|---|---|---|---|---|---|---|---|---|---|
| (250, 250, 100, 10) | e | 3e−12 | 0.880 | 0.214 | 0.214 | 0.215 | 0.332 | 0.161 | 0.330 | 2e−12 | 0.259 |
| $\eta = 0$ | std.e | 2e−12 | 0.018 | 0.019 | 0.019 | 0.019 | 0.014 | 0.024 | 0.012 | 9e−12 | 0.016 |
| | t(s) | 0.062 | 1.902 | 3.143 | 7.740 | 2.882 | 1.780 | 1.509 | 0.039 | 0.819 | 1.344 |
| | std.t | 0.006 | 0.354 | 4.300 | 0.038 | 0.014 | 0.041 | 1.041 | 3e−04 | 0.023 | 0.708 |
| (250, 250, 100, 10) | e | 0.077 | 0.885 | 0.217 | 0.216 | 0.219 | 0.334 | 0.164 | 0.335 | 0.009 | 0.263 |
| $\eta = 0.01$ | std.e | 0.006 | 0.031 | 0.019 | 0.018 | 0.020 | 0.019 | 0.019 | 0.017 | 3e−04 | 0.018 |
| | t(s) | 0.084 | 1.907 | 21.768 | 11.319 | 2.923 | 1.785 | 1.412 | 0.039 | 0.400 | 1.086 |
| | std.t | 0.010 | 0.266 | 0.261 | 0.291 | 0.014 | 0.041 | 0.988 | 3e−04 | 0.002 | 0.738 |
| (250, 250, 100, 10) | e | 0.225 | 0.888 | 0.238 | 0.237 | 0.262 | 0.342 | 0.231 | 0.345 | 0.136 | 0.276 |
| $\eta = 0.1$ | std.e | 0.016 | 0.020 | 0.019 | 0.019 | 0.019 | 0.019 | 0.018 | 0.015 | 0.010 | 0.019 |
| | t(s) | 0.076 | 1.917 | 4.430 | 16.649 | 2.876 | 1.781 | 1.555 | 0.039 | 0.413 | 1.135 |
| | std.t | 0.007 | 0.299 | 0.069 | 1.184 | 0.014 | 0.025 | 0.756 | 4e−04 | 0.011 | 0.817 |
| (500, 500, 200, 20) | e | 4e−11 | 1.246 | 0.162 | 0.164 | 0.167 | 0.381 | 0.136 | 0.381 | 3e−13 | 0.239 |
| $\eta = 0$ | std.e | 1e−10 | 0.018 | 0.011 | 0.011 | 0.011 | 0.010 | 0.009 | 0.008 | 6e−14 | 0.009 |
| | t(s) | 0.464 | 23.332 | 16.778 | 89.090 | 16.604 | 8.602 | 5.557 | 0.347 | 6.517 | 15.300 |
| | std.t | 0.024 | 2.991 | 0.878 | 1.836 | 0.100 | 0.216 | 4.810 | 0.009 | 0.126 | 3.509 |
| (500, 500, 200, 20) | e | 0.082 | 1.247 | 0.160 | 0.162 | 0.166 | 0.374 | 0.139 | 0.378 | 0.012 | 0.236 |
| $\eta = 0.01$ | std.e | 0.003 | 0.018 | 0.007 | 0.007 | 0.008 | 0.011 | 0.010 | 0.006 | 2e−04 | 0.007 |
| | t(s) | 0.592 | 23.214 | 128.51 | 122.61 | 16.823 | 8.541 | 6.134 | 0.354 | 2.361 | 15.165 |
| | std.t | 0.060 | 3.679 | 1.155 | 6.500 | 0.036 | 0.219 | 4.318 | 0.019 | 0.064 | 3.485 |
| (500, 500, 200, 20) | e | 0.203 | 1.262 | 0.204 | 0.204 | 0.250 | 0.391 | 0.275 | 0.398 | 0.166 | 0.270 |
| $\eta = 0.1$ | std.e | 0.007 | 0.012 | 0.007 | 0.007 | 0.007 | 0.012 | 0.272 | 0.009 | 0.005 | 0.008 |
| | t(s) | 0.563 | 24.112 | 24.312 | 202.22 | 16.473 | 8.552 | 8.745 | 0.348 | 2.192 | 15.150 |
| | std.t | 0.061 | 2.362 | 0.226 | 8.362 | 0.050 | 0.155 | 3.408 | 0.010 | 0.064 | 3.420 |

Video Surveillance

For background subtraction in surveillance videos, we consider the following two videos: "Lobby in an office building with switching on/off lights" and "Shopping center" from http://perception.i2r.a-star.edu.sg/bk_model/bk_index.html. In the first video, the resolution is 160×128 and we used 1546 frames from 'SwitchLight1000.bmp' to 'SwitchLight2545.bmp'. In the second video, the resolution is 320×256 and we use 1000 frames from 'ShoppingMall1001.bmp' to 'ShoppingMall2000.bmp'. Therefore, the data matrices are of size 1546×20480 and 1001'81920. We used a computer with Intel Core 2 Quad Q6600 2.4 GHz and 8 GB memory due to the large size of these data.

We applied GMS, GMS2 and EGMS with d=3 and with initial dimensionality reduction to 200 to reduce running time. For this data we are unaware of a standard choice of d; though we noticed empirically that the outputs of our algorithms as well as other algorithms are very stable to changes in d within the range 2≤d≤5. We obtain the foreground by the orthogonal projection to the recovered 3-dimensional subspace.

Figure 6:
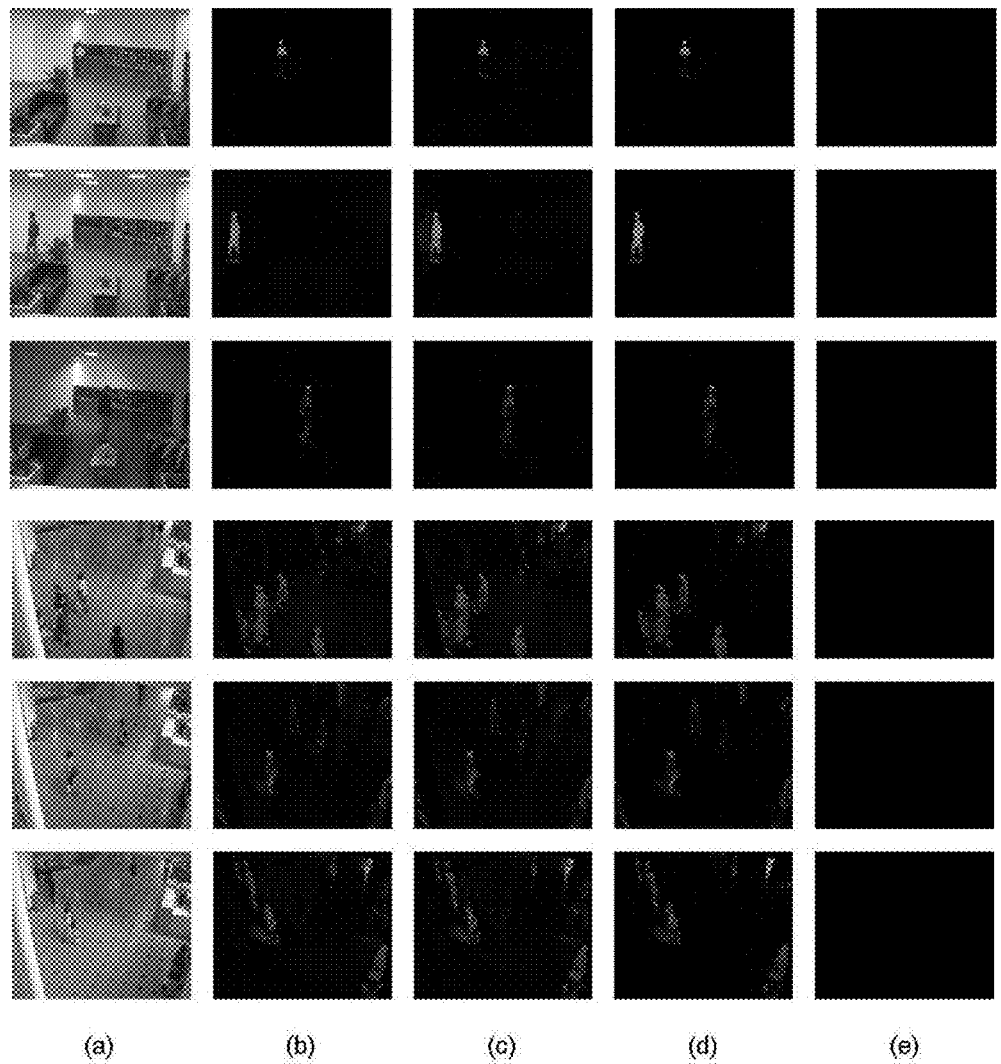
FIG. 6 shows frames from video surveillance: (a) the given frames (b)-(e) the detected foreground by EGMS, GMS, GMS2, PCP, LLD respectively.
Figure 7A:
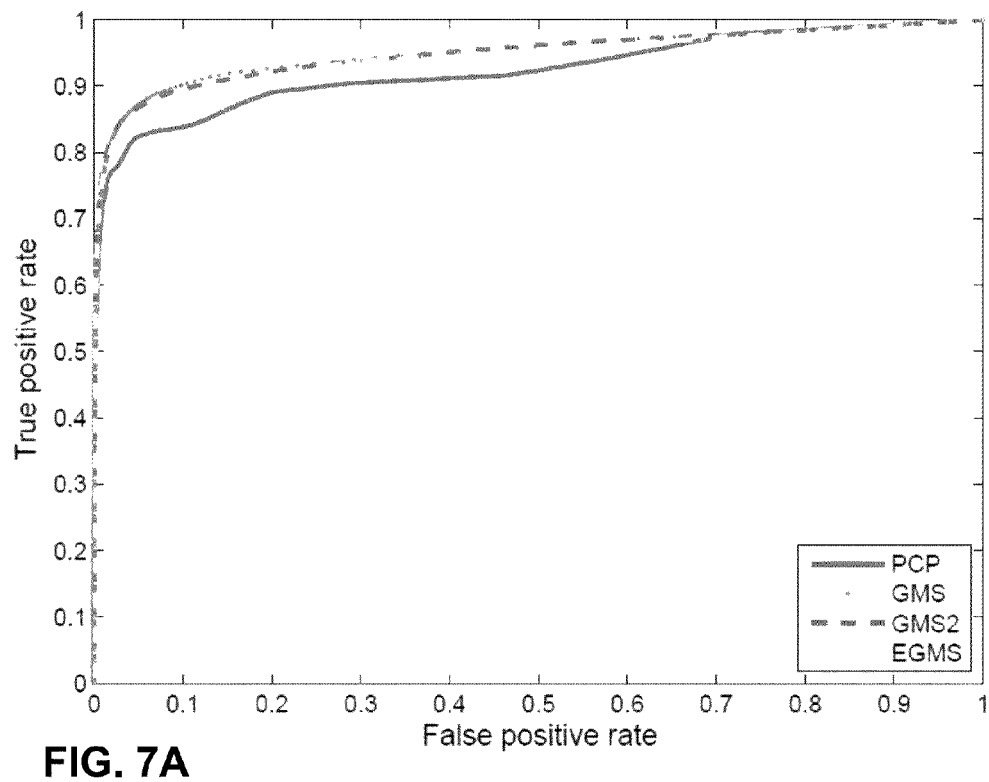
FIGS. 7A and 7B are graphs that show ROC curves for EGMS, GMS, GMS2 and PCP the in 'SwitchLight' video (7A) and the 'Shoppingmall' video (7B).
Figure 7B:
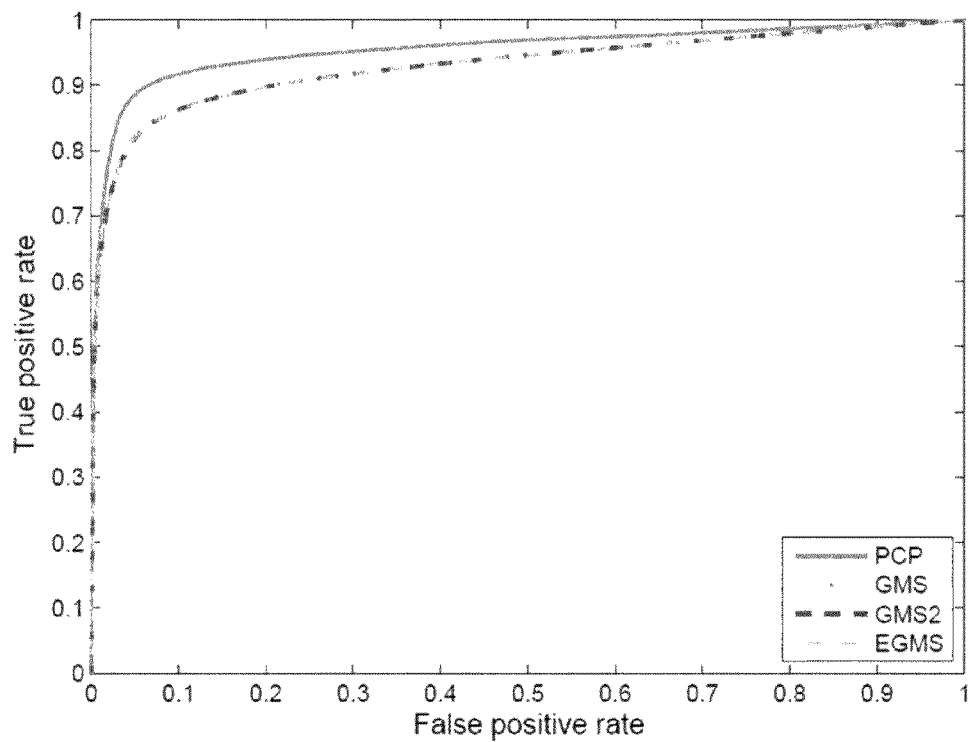

FIG. 6 shows frames from video surveillance: (a) the given frames (b)-(e) the detected foreground by EGMS, GMS, GMS2, PCP, LLD respectively. FIG. 6 demonstrates foregrounds detected by EGMS, GMS, GMS2, PCP and LLD, where PCP and LLD used $\lambda=1/\sqrt{\max(D,N)}, 0.8\sqrt{D/N}$. We remark that OP ran out of memory. Using truth labels provided in the data, we also form ROC curves for GMS, GMS2, EGMS and PCP in FIG. 6 (LLD is not included since it performed poorly for any value of λ we tried). We note that PCP performs better than both GMS and EGMS in the 'Shoppingmall' video, whereas the latter algorithms perform better than PCP in the 'SwitchLight' video. Furthermore, GMS is significantly faster than EGMS and PCP. Indeed, the running times (on average) of GMS, EGMS and PCP are 91.2, 1018.8 and 1209.4 seconds respectively. FIGS. 7A and 7B are graphs that show ROC curves for EGMS, GMS, GMS2 and PCP the in 'SwitchLight' video (7A) and the 'Shoppingmall' video (7B).

Figure 8:
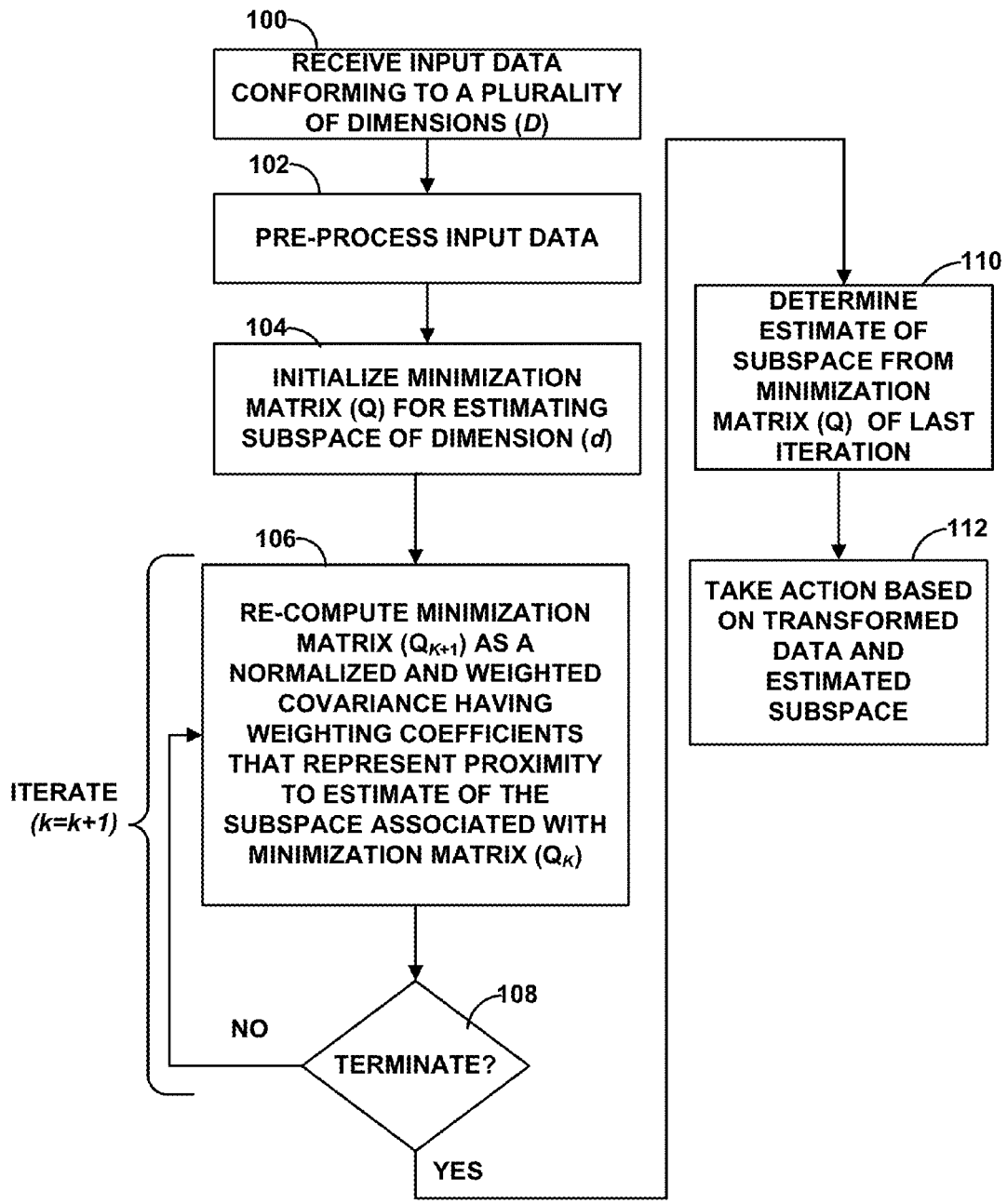
FIG. 8 is a flowchart illustrating an example operation of the estimator applying the techniques described here.

FIG. 8 is a flowchart illustrating example operation of a data analysis system in accordance with the techniques described herein. For purposes of example, FIG. 8 will be explained in reference to estimator 22 executed by data analysis system 10 of FIG. 1.

Initially, estimator 22 receives input data from a sensor, such as image source 12 (100). The input data comprises a set of data points that conforms to a plurality of dimensions (D) and includes outlier data points, such as noise.

In some examples, estimator 22 pre-processes the data points (104). For example, as explained above, estimator 22 may insert a plurality of artificial outlier data points into the set of data point prior to iteratively processing the set of data points to compute the reduced data set. As another example, as also explained herein, estimator 22 may normalize each of the data points to a unit sphere by dividing each of the data points to a corresponding Euclidean norm of the data point.

After optionally pre-processing the set of data points, estimator 22 initializes a minimization matrix (Q) for estimating a subspace of dimension (d) (104). The minimization matrix (Q) (or A for a non-inverse covariance matrix) initialized for use with any of the techniques described herein, such as the GMS technique (Algorithm 2) or the Extended GMS technique (Algorithm 3).

Next, estimator 22 iteratively re-computes the minimization matrix ($Q_{k+1}$) as a normalized and weighted covariance having weighting coefficients that represent proximity to estimate of the subspace associated with minimization matrix ($Q_k$) (106). As explained above, estimator 22 may, in some example implementations, compute the minimization matrix ($Q_{k+1}$) in inverse form, i.e., an inverse covariance matrix. In this way, estimator 22 determines, for each iteration, a scaled version of the set of data points by re-computing a corresponding coefficient for each of the data points as a function of a proximity of the data point to a current estimate of the subspace, and re-computes, for each iteration, the minimization matrix ($A_{k+1}$) representing an updated estimate of the subspace based on a summation of weighted least absolute squares of the scaled version of the set of data points.

Estimator 22 repeats this process until convergence or a sufficient number of iterations (108).

Upon terminating the iterative process (YES of 108), estimator 22 determines the estimate of the subspace from the minimization matrix ($Q_k$) (110). For example, when using $Q_k$ in the form of an inverse covariance matrix, estimator 22 extracts, as the subspace, a bottom set of d eigenvectors from the computed minimizer $Q_{k+1}$. As another example, when using $Q_k$ in the form of a covariance matrix, estimator 22 extracts, as the subspace, a top set of d eigenvectors from the computed minimizer $A_{k+1}$.

Upon determining the reduced data set including the subspace, data analysis system 10 may take action. For example, data analysis system 10 may further process the reduced data set in view of the determined subspace to perform face recognition with respect to the image data received from the image source. As other examples, data analysis system 10 may further process the reduced data set in view of the determined subspace perform computer vision, machine learning or other actions.

Figure 9:
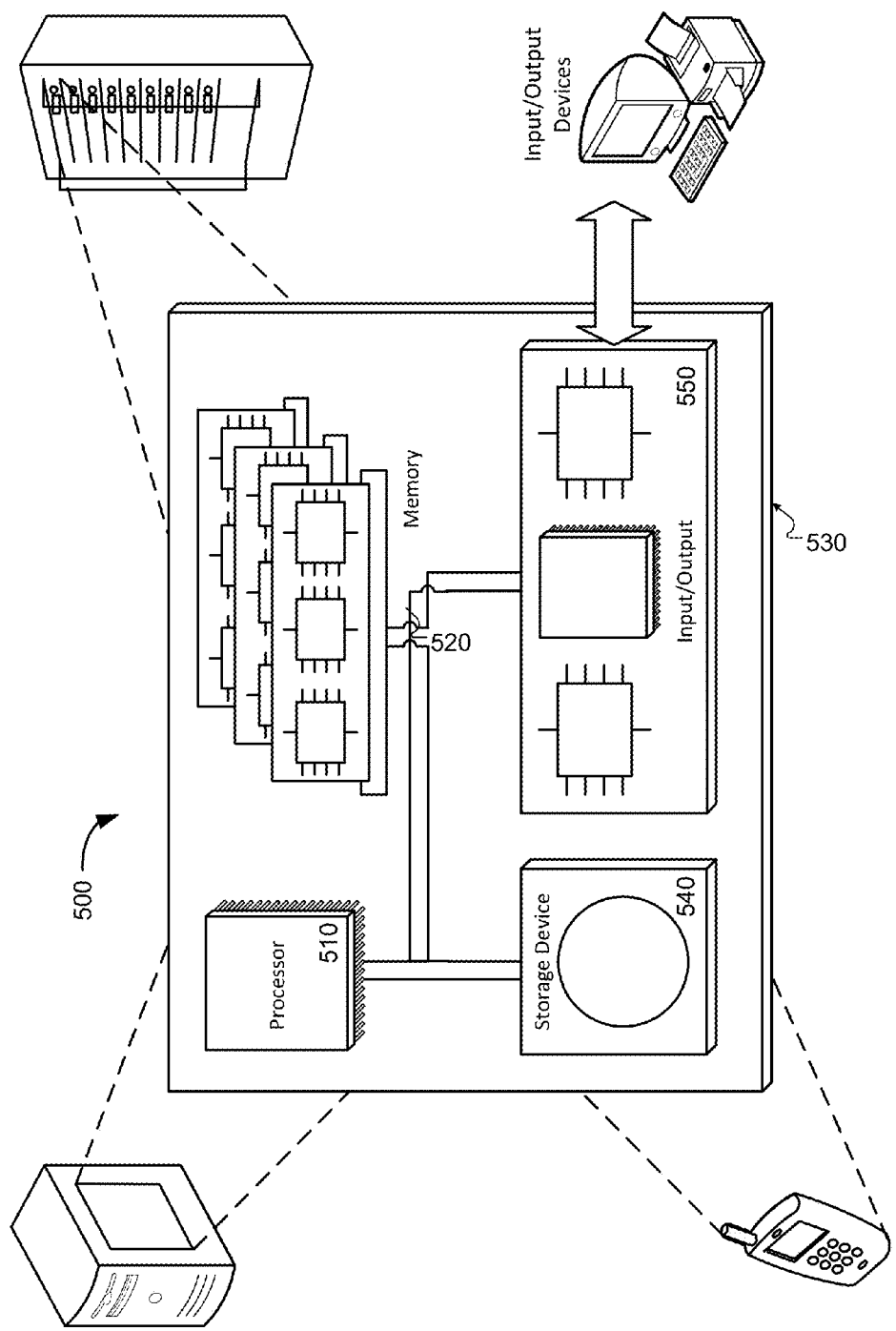
FIG. 9 shows a detailed example of a device, such as an image processing device, sensor, data analysis system, computer vision system, that may be configured to execute program code to practice some embodiments of the invention.

FIG. 9 shows a detailed example of various devices, e.g., image processing devices, sensors, data analysis systems, computer vision systems, that may be configured to execute program code to practice some embodiments of the invention. Computer 500 may, for example, represent one example implementation of data analysis system 10 of FIG. 1 and, in this way, provide an operating environment for execution of estimator 22 to perform the techniques described herein.

Here, a computer 500 includes a processor 510 that is operable to execute program instructions or software, causing the computer to perform various methods or tasks. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a smart phone, a rack-mount or business computer or server as shown in FIG. 5, or any other type of computerized system such as an image capture or processing device. Other examples include appliances such as a set-top box, including a separate appliance or incorporated into another appliance such as a media player or television. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

An M-estimator is described herein for the problems of exact and near subspace recovery. The recovery obtained by this estimator is quantified as well as its numerical approximation. Numerical experiments demonstrate state-of-the-art speed and accuracy for the implementation on both synthetic and real data sets.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the embodiments of the invention described herein. It is intended that this invention be limited only by the claims, and the full scope of equivalents thereof.

The invention claimed is:

1. A method comprising:
receiving, with an image processing device, multidimensional image data that captures a set of one or more features visible within a physical environment, wherein the image data comprising a set of data points conforming to a plurality of dimensions (D) and including outlier data points; and removing one or more objects from the image data by iteratively processing the set of data points with the image processing device to compute a reduced data set representative of the set of data points of the image data, wherein the reduced data set conforms to a subspace having a reduced number of dimensions (d) less than the plurality of dimensions (D) of the set of data points of the image, wherein iteratively processing the set of data points of the image data to compute the reduced data set comprises:

determining, for each iteration, a scaled version of the set of data points by re-computing a corresponding coefficient for each of the data points as a function of a proximity of the data point to a current estimate of the subspace, and computing, for each iteration, an updated estimate of the subspace based on a minimization of a sum of least squares of the scaled version of the set of data points; and processing, with the image processing device, the reduced data set representative of the image data to identify one or more features within the physical environment.

2. The method of claim 1, wherein computing, for each iteration, the updated estimate comprises computing a scaled covariance matrix from the scaled version of the set of data points, wherein the scaled covariance matrix encodes the updated estimate of the subspace.

3. The method of claim 2, wherein the scaled covariance matrix comprises a scaled inverse covariance matrix.

4. The method of claim 1, wherein iteratively processing the set of data points to compute the reduced data set has a processing complexity with linear convergence with respect to the number of iterations.

5. The method of claim 1, wherein the outlier data points represent noise.

6. The method of claim 1, wherein computing, for each iteration, an updated estimate of the subspace based on a summation of weighted least absolute squares of the scaled version of the set of data points comprises computing, for each iteration, a minimizer matrix $Q_{k+1}$ as:

$$Q_{k+1} = \left(\sum_{i=1}^{N} \frac{x_i x_i^T}{\max(\|Q_k x_i\|, \delta)}\right)^{-1} / tr\left(\left(\sum_{i=1}^{N} \frac{x_i x_i^T}{\max(\|Q_k x_i\|, \delta)}\right)^{-1}\right)$$

for each iteration k, where $\chi = \{x_1, x_2, \ldots, x_N\}$ represents the set of data points, and $\|Q_k x_i\|$ operates as the coefficient representative, for each of the data points, the proximity of the data point to the current estimate of the subspace.

7. The method of claim 6, further comprising, after iteratively computing the minimizer matrix, extracting as the subspace a bottom set of d eigenvectors from the computed minimizer $Q_{k+1}$.

8. The method of claim 1, wherein computing, for each iteration, an updated estimate of the subspace based on a summation of weighted least absolute squares of the scaled version of the set of data points comprises computing, for each iteration, a minimizer matrix $A_{n+1}$ as:

$$A_{n+1} = \sum_{i=1}^{N} \frac{x_i x_i^T}{\|A_n^{-1} x_i\|},$$

$$A_{n+1} = A_{n+1} \cdot tr(A_{n+1}^{-1})$$

for each iteration n, where $\chi = \{x_1, x_2, \ldots, x_N\}$ represents the set of data points, and $\|A_n^{-1} x_i\|$ operates as the coefficient representative, for each of the data points, the proximity of the data point to the current estimate of the subspace.

9. The method of claim 8, further comprising, after iteratively computing the minimizer matrix, extracting as the subspace a top set of d eigenvectors from the computed minimizer $A_{n+1}$.

10. The method of claim 1,
wherein the reduced data set comprises image data having shadows, reflections or saturations removed, and
wherein processing the reduced data set to identify one or more objects comprises processing the reduced data set to identify a face captured within the image data.

11. The method of claim 1, wherein the image processing device comprises a video surveillance device and the reduced data set comprises image data of moving objects having a background removed.

12. The method of claim 1, wherein the multidimensional data and the reduced data set comprises a three dimensional (3D) structure.

13. The method of claim 1, further comprising identifying the outlier data points based on the reduced data set.

14. The method of claim 1, further comprising, prior to iteratively processing the set of data points to compute the reduced data set, inserting a plurality of artificial outlier data points to the set of data point prior to iteratively processing the set of data points to compute the reduced data set.

15. The method of claim 1, further comprising, prior to iteratively processing the set of data points to compute the reduced data set, normalizing each of the data points to a unit sphere by dividing each of the data points to a corresponding Euclidean norm of the data point.

16. The method of claim 1, further comprising, prior to iteratively processing the set of data points to compute the reduced data set, normalizing each of the data points to a unit sphere by dividing each of the data points to a corresponding Euclidean norm of the data point.

17. The image processing device of claim 1,
wherein the reduced data set comprises image data having shadows, reflections or saturations removed, and
wherein the program code processes the reduced data set to identify a face captured within the image data.

18. The image processing device of claim 1, wherein the device comprises a video surveillance device and the reduced data set comprises image data of moving objects having a background removed.

19. An image processing device comprising:
memory to store multidimensional image data comprising a set of data points conforming to a plurality of dimensions (D) and having a set of outliers; and
a processor configured to execute program code to process the multidimensional image data to remove objects from the image data by computing a reduced data set that is representative of the multidimensional image data without the outliers,
wherein the program code iteratively processes the set of data points of the image data with the device to compute a reduced data set representative of the set of data points, wherein the reduced data set conforms to a subspace having a reduced number of dimensions (d) less than the plurality of dimensions (D) of the set of data points, wherein the program code determines, for each iteration, a scaled version of the set of data points by re-computing a corresponding coefficient for each of the data points as a function of a proximity of the data point to a current estimate of the subspace, wherein the program code computes, for each iteration, an updated estimate of the subspace based on a minimization of a sum of least squares of the scaled version of the set of data points, and wherein the program code processes the reduced data set representative of the image data to identify one or more features within the physical environment.

20. The image processing device of claim 19, wherein, for each iteration, the program code computes the updated estimate of the subspace by computing a scaled covariance matrix from the scaled version of the set of data points, wherein the scaled covariance matrix encodes the updated estimate of the subspace.

21. The image processing device of claim 20, wherein the scaled covariance matrix comprises a scaled inverse covariance matrix.

22. The image processing device of claim 19, wherein the program code iteratively processes the set of data points to compute the reduced data set with linear convergence with respect to the number of iterations.

23. The image processing device of claim 19, wherein the program code re-computes a minimizer matrix $Q_{k+1}$ as:

$$Q_{k+1} = \left(\sum_{i=1}^{N} \frac{x_i x_i^T}{\max(\|Q_k x_i\|, \delta)}\right)^{-1} \Big/ tr\left(\left(\sum_{i=1}^{N} \frac{x_i x_i^T}{\max(\|Q_k x_i\|, \delta)}\right)^{-1}\right)$$

for each iteration k, where $\chi = \{x_1, x_2, \ldots, x_N\}$ represents the set of data points, and $\|Q_k x_i\|$ operates as the coefficient representative, for each of the data points, the proximity of the data point to the current estimate of the subspace.

24. The image processing device of claim 23, wherein the program code, after iteratively computing the minimizer matrix, extracts as the subspace a bottom set of d eigenvectors from the computed minimizer $Q_{k+1}$.

25. The image processing device of claim 19, wherein the program code re-computes a minimizer matrix $A_{n+1}$ as:

$$A_{n+1} = \sum_{i=1}^{N} \frac{x_i x_i^T}{\|A_n^{-1} x_i\|},$$

$$A_{n+1} = A_{n+1} \cdot tr(A_{n+1}^{-1})$$

for each iteration n, where $\chi = \{x_1, x_2, \ldots, x_N\}$ represents the set of data points, and $\|A_n^{-1} x_i\|$ operates as the coefficient representative, for each of the data points, the proximity of the data point to the current estimate of the subspace.

26. The image processing device of claim 25, wherein the program code, after iteratively computing the minimizer matrix, extracting as the subspace a top set of d eigenvectors from the computed minimizer $A_{n+1}$.

* * * * *